United States Patent [19]
Nobusawa

[11] 3,882,510
[45] May 6, 1975

[54] OSCILLATION SYSTEMS FOR CONTROL OF CAMERA SHUTTERS

[75] Inventor: Tsukumo Nobusawa, Tokyo, Japan

[73] Assignee: Asahi Kogaku Kogyo Kabushiki Kaisha, Tokyo, Japan

[22] Filed: Oct. 5, 1973

[21] Appl. No.: 403,829

[30] Foreign Application Priority Data
Oct. 6, 1972 Japan.............................. 47-99901
Oct. 6, 1972 Japan.............................. 47-99902
Oct. 23, 1972 Japan............................ 47-105232
Oct. 23, 1972 Japan............................ 47-105233

[52] U.S. Cl. ...................... 354/24; 354/31; 354/51; 354/60
[51] Int. Cl. ............................................. G03b 7/08
[58] Field of Search .............. 354/60, 51, 24, 50, 31

[56] References Cited
UNITED STATES PATENTS
3,711,721  1/1973  Hansen .............. 354/51 X
3,726,194  4/1973  Nobresawa ........ 354/60 X
3,732,011  5/1973  Hansard ............ 354/60 L
3,791,272  2/1974  Nobresawa ........ 354/51 X

*Primary Examiner*—Joseph F. Peters, Jr.
*Attorney, Agent, or Firm*—Steinberg & Blake

[57] ABSTRACT

An electronic control for a camera shutter of the frequency conversion type including an oscillation circuit for providing a series of pulse signals whose frequency is a function of the light intensity of an object being photographed. A shutter opening circuit opens the shutter in response to one of the pulses following commencement of a release operation. An exposure circuit converts preset exposure factors into a time duration and provides a control signal after elapse of the time duration following the release operation. A shutter closing circuit receives the control signal and in cooperation therewith closes the shutter.

27 Claims, 33 Drawing Figures

| 50 | 51 | 2 | 3 | 4 |
| --- | --- | --- | --- | --- |
| MEMORY CIRCUIT FOR INFORMATION ON LIGHT INTENSITY OF AN OBJECT TO BE PHOTOGRAPHED | OSCILLATOR CIRCUIT ADAPTED TO RESPOND TO THE STORED VOLTAGE | LEADING SHUTTER CURTAIN RELEASING CIRCUIT | EXPOSURE FACTOR CONTROL CIRCUIT | TRAILING SHUTTER CURTAIN RELEASING CIRCUIT |

OSCILLATION SYSTEMS FOR CONTROL OF CAMERA SHUTTERS

BACKGROUND OF THE INVENTION

The present invention relates to cameras.

In particular, the present invention relates to a control circuit for a camera shutter.

In one type of electrically-controlled camera shutter, information relating to the light intensity of an object to be photographed is converted into an oscillation frequency whose frequency is a function of the light intensity. The oscillation frequency is in fact determined by a time constant corresponding to the prduct of the internal resistance R of a photoconductive element receiving the light intensity and a capacitor C electrically connected in circuit therewith. The oscillation pulses serve to drive the shutter. Since the proper exposure time is dependent not only on the light intensity at the photographed object but on other exposure factors such a film sensitivity, it is necessary to modify the frequency of the pulses in accordance with the exposure factors. For example, as the ASA sensitivity of the film is doubled, the frequency of the oscillation pulses should be doubled, and as the ASA sensitivity is reduced by two levels, the frequency should be reduced by one quarter.

Since the period of the pulses is determined by the resistance of the photoconductive element and the capacitor, by varying either of these two values it is possible to vary the frequency. The usual procedure is to vary the internal resistance of the photoconductive element by providing a diaphragm in front of the element so as to limit the amount of light incident upon the photoconductive element. As the diaphragm opening is varied, the internal resistance of the photoconductive element will also be varied. Such an arrangement however is only possible when the photoconductive element measures the light externally of the camera. When the photoconductive element is located internally of the camera to measure the light which passes through the objective of the camera, it is not possible to vary the diaphragm opening since the internal photoconductive element does not have a diaphragm of its own.

Although it would be possible to provide means to vary the capacitor, a plurality of ASA conversion systems must then be provided in accordance with the different ASA sensitivities, and it would be technically difficult for all of these different ASA conversion systems to be incorporated within the camera body. Furthermore, in an arrangement utilizing a plurality of capacitors there would be required a plurality of switches with high contact precision as well as high cost capacitors with low leakage current. This would result in an extremely costly and cumbersome device. In addition, since the capacitors each have a discrete value, there could only be discrete frequency selection values and it would not be possible in this arrangement to achieve a continuously variable adjustment. The sensitivity of the camera is therefore reduced since it would be impossible to subject film to slightly over or under exposure depending upon the particular situation of the object being photographed.

When electric shutters of the type described are utilized together with logarithmic compression and expansion circuitry, exposure factor control, such as ASA conversion, is generally accomplished during the time that the signal is logarithmically compressed. However, since the compressed voltage is extremely low, little accuracy is obtained in exposure factor control and even slight errors in such control would subsequently be multiplied to a large error during the subsequent process of logarithmic expansion. Furthermore, since the logarithmic compression elements are generally dependent on such factors as temperature and source voltage, a slight variation in the temperature or voltage will subsequently, during logarithmic expansion, be greatly multiplied thereby increasing the possible error in exposure control.

SUMMARY OF THE INVENTION

It is accordingly a primary object of the present invention to provide a circuit for controlling the shutter operation of a camera in a manner which will avoid the aforementioned drawbacks.

In particular, it is an object of the present invention to provide an electric shutter of the frequency conversion type which achieves exposure factor control by means other than varying the internal resistance of the photoelectric element or the value of the series capacitor.

A further object of the invention is to provide an electric shutter of the frequency conversion type such that, after the shutter has been opened with a first pulse from a pulse oscillator circuit having a frequency varying according to light intensity at an object to be photographed, the shutter is closed with a latter pulse after a time duration based upon exposure factor values.

A still further object of the invention is to provide a control circuit for an electric shutter which permits exposure factor control to be done during a logarithmic expanded signal level thereby reducing the error of exposure factor control to a minimum.

Yet another object of the invention is to provide a control circuit for an electric camera shutter which can be used for an electric shutter having a photoelectric element either responding to light external to the camera or light internally passing through the camera objective.

Thus, it is an object of the present invention to provide an electric shutter control circuit of the above type which is far more accurate than previously known similar systems while at the same time being simpler and more reliable in its operation.

According to the invention the control circuit for the camera shutter includes oscillation means for providing a series of pulse signals whose frequency is a function of light intensity at an object to be photographed. A shutter-opening circuit means opens the shutter in response to one of the pulses which is selected by commencing a release operation. An exposure circuit converts preset exposure factors into a time duration and provides a control signal after the elapse of the time duration following the release operation. A shutter-closing circuit means receives the control signal and in cooperation therewith closes the shutter.

In a first system of the present invention after the release operation each of the pulses are applied from the oscillator to the shutter closing circuit. However, they are blocked from affecting the shutter circuit until such time as the control signal occurs whereupon the next subsequent pulse from the series of pulse signals serves to close the shutter.

In a second system, after a pulse which opens the shutter, the exposure circuit stops the oscillator from producing subsequent pulses until such time as the control signal occurs whereupon the oscillator is again permitted to produce pulses such that the next immediately following pulse serves to close the shutter.

In a third system the series of pulses from the oscillator are sent to a cascaded flip-flip arrangement which produces a series of signals the number of which is preset based upon the exposure factors. When the preselected number of signals from the flip-flop has been reached either that signal can close the shutter or that signal can have the next subsequent pulse from the oscillator close the shutter.

In a fourth system the series of pulses from the oscillator are stored cumlatively as a voltage whereupon when the cumulative stored voltage equals a predetermined value, the shutter is closed by the next following pulse from the oscillator.

In each of the above four systems, modifications can be made to utilize the control circuit with a photosensitive element located to receive the light external to the camera or, by adding a memory circuit, a photosensitive element can be located internally of the camera to measure the light passing through the objective. Furthermore, each of the systems can be modified to use logarithmic compression and expansion circuitry wherein a memory circuit stores information in a logarithmic compressed form while both the oscillator and the exposure factor control circuit operate with logarithmically expanded signals.

BRIEF DESCRIPTION OF DRAWINGS

The invention is illustrated by way of example in the accompanying drawings which form part of this application and in which:

FIG. 2 is a wiring diagram of one possible embodiment according to the first system;

FIG. 3 is a graph showing oscillation pulses;

FIG. 4 is a modification of the wiring diagram of FIG. 2 using a different type of switching arrangement within the circuit;

FIG. 5 is a schematic block diagram illustrating a modification wherein a photosensitive element is located internally of the camera;

FIG. 6 is a wiring diagram of one possible embodiment according to the block diagram of FIG. 5; and FIG. 7 is a modification of the wiring diagram of FIG. 6 and includes logarithmic compression and expansion circuitry.

FIG. 9 is a wiring diagram of one possible embodiment according to the second system and utilizing a Schmitt trigger;

FIG. 10 is a graph showing oscillation pulses;

FIG. 11 is a wiring diagram of another possible embodiment according to the second system utilizing a monostable multivibrator and a modified switching arrangement;

FIG. 12 is a schematic block diagram indicating a modification of the second system of this invention utilizing a photosensitive element internally of the camera;

FIG. 13 is a wiring diagram of one possible embodiment according to the block diagram of FIG. 12 utilizing a Schmitt trigger;

FIG. 14 is a wiring diagram of another possible system according to the block diagram of FIG. 12 utilizing a monostable multivibrator; and FIG. 15 is a wiring diagram showing another possible embodiment according to the block diagram of FIG. 12 including logarithmic compression and expansion circuitry.

FIGS. 16–21 relate to a third system of the present invention wherein a cascade of flip-flop elements are used and wherein FIG. 16 is a schematic block diagram illustrating the principle of operation of the third system of the present invention;

FIG. 17 is a wiring diagram of one possible embodiment according to the third system of the invention;

FIGS. 18 and 19 are graphs representing oscillation pulses and different time durations;

FIG. 20 is a modification of the circuit of FIG. 17 wherein the outputs of the flip-flops are utilized directly to close the shutter; and FIG. 21 is a wiring diagram showing a further modification of the circuit of FIG. 20 including logarithmic compression and expansion circuitry.

FIGS. 22–33 refer to a fourth system of the present invention wherein the pulses from the oscillator are cumulatively stored until a predetermined value is reached, and wherein FIG. 22 is a schematic block diagram illustrating the principles of the fourth system of the present invention;

FIG. 23 is a wiring diagram of one possible embodiment according to the fourth system of this invention;

FIG. 24 is a wiring diagram of a modification of the circuit of FIG. 23 specifically including an additional photosensitive element and a modified switching circuit;

FIG. 25 is a schematic block diagram illustrating a modification of the fourth system, specifically wherein the photosensitive element is located internally of the camera;

FIG. 26 is a wiring diagram of one possible embodiment according to the block diagram of FIG. 25;

FIG. 27 is a modification of the circuit of FIG. 26 specifically including logarithmic compression and expansion circuitry;

FIGS. 28 and 29 show circuit arrangements for obtaining equal steps of voltage to be stored;

FIG. 30 shows a graph of the stored voltage as a function of elapsed time;

FIG. 31 shows a pulsating signal utilized in the circuitry of the fourth system;

FIG. 32 shows a graph of stored voltage as a function of elapsed time; and

FIG. 33 is a wiring diagram of one possible system according to the circuit shown in FIGS. 28 and 29.

DESCRIPTION OF PREFERRED EMBODIMENTS

PULSE FREQUENCY SYSTEM

Figure 1:
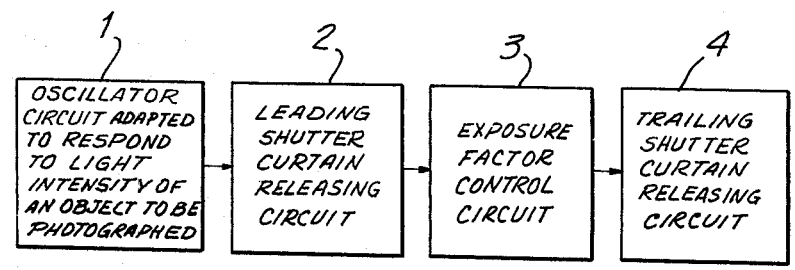
FIGS. 1–7 relate to a first system of the present invention with FIG. 1 being a schematic block diagram illustrating the principle of operation of the first system.

Referring first to FIG. 1 the principle according to which the present invention operates is schematically illustrated therein. Block 1 represents an oscillator circuit adapted to respond to light intensity at the photographed object for providing a series of pulses whose frequency is a function of the light intensity at the object being photograhed. Block 2 represents a leading shutter curtain releasing circuit which is activated by one of the pulses from the oscillator circuit following commencement of a release operation. An exposure factor control circuit represented by block 3 determines a time duration during which the shutter remains open and at the conclusion of the time duration provides a control signal which is sent to the trailing shutter curtain releasing circuit represented by block 4, which then closes the shutter. In the present first system, the pulses from the oscillator circuit are continuously sent to the trailing shutter curtain releasing circuit 4, but in the absence of a control signal none of these affect the trailing circuit 4. After a control signal is received, the next subsequent pulse from the oscillator circuit will close the trailing shutter curtain.

Figure 2:
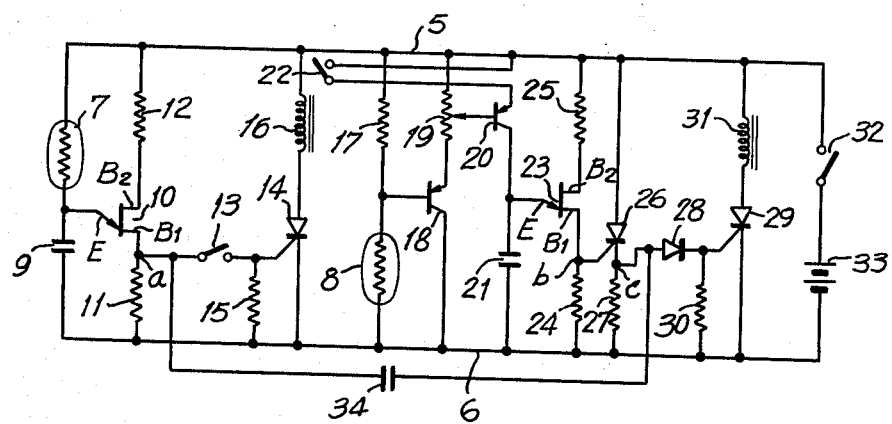

Referring now to FIG. 2, which illustrates a wiring diagram corresponding to FIG. 1, there is shown a DC source 33 connected in series with a source switch 32 between a positive bus 5 and a negative bus 6. Two photoconductive elements 7 and 8 are adapted to detect light intensity at a photographed object and are shown by way of example as CdS elements. A timing capacitor 9 is connected in series with CdS element 7 between the positive and negative buses 5 and 6. A junction between elements 7 and 9 is connected to the emitter E of a unijunction transistor (hereinafter to be referred to as UJT) 10. The first base $B_1$ and the second base $B_2$ of UJT 10 are connected respectively through resistors 11 and 12 to the negative bus 6 and the positive bus 5. The first base $B_1$ of UJT 10 is connected to the gate of a thyristor means 14 through a switch 13 which is adapted to be closed during depression of a shutter release button on the camera. Thyristor means 14 controls the operation of the leading curtain. The gate of thyristor 14 is connected to the negative bus 6 through a resistor 15. The cathode of thyristor 14 is connected to the negative bus 6 and the anode thereof is connected to the positive bus 6 through an electromagnetic solenoid 16 which when energized causes the leading curtain to run down in a known way for opening the shutter to start the exposure. One end of CdS 8 is connected to the negative bus 6 and the other end thereof is connected to the positive bus 5 through a resistor 17. A junction between CdS 8 and the resistor 17 is connected to the base of a transistor 18, the collector of which is connected to the negative bus while the emitter thereof is connected to the positive bus 5 through a variable resistor 19 adapted to be set in accordance with exposure factors such as ASA sensitivity. A slidable contact of the variable resistor 19 is connected to the base of a transistor 20, the collector of which is connected to the negative bus 6 through a timing capacitor 21. The emitter of the transistor 20 is connected to the positive bus 5 through the normally open contact switch 22 in the form of an armature controlled by solenoid 16.

The collector of the transistor 20 is connected to the emitter E of UJT 23 while the first base $B_1$ and the second base $B_2$ thereof are respectively connected through resistors 24 and 25 to the negative bus 6 and the positive bus 5. The first base $B_1$ of UJT 23 is also connected to the gate of tyristor means 26. The cathode of the thyristor 26 is connected to the negative bus through a resistor 27, and the anode thereof is connected to the positive bus 5. The cathode of thyristor 26 is also connected to a diode 28 having a polarity such that the anode of the diode is coupled to the cathode of the thyristor. The diode is connected to the gate of thyristor 29 which controls the trailing shutter operation. The gate of thyristor 29 is connected to the negative bus 6 through a resistor 30 and the cathode thereof is directly connected to the nagative bus 6. The anode of thyristor 29 is connected to the positive bus 5 through an electromagnetic solenoid 31 which when energized releases the trailing shutter curtain for terminating the exposure. A capacitor 34 is connected between the first base $B_1$ of UJT 10 and the cathode of the thyristor 26.

Figure 3:
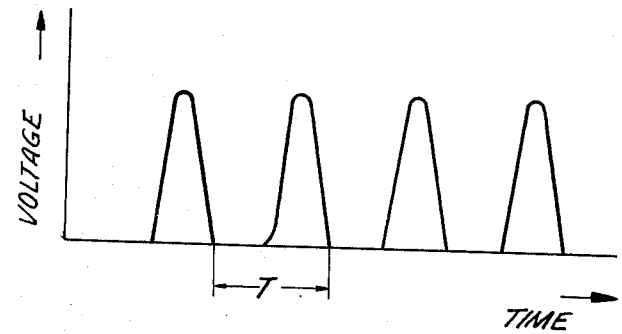

The circuit shown in FIG. 2 operates as follows: Upon closure of the source switch 32 prior to exposure, UJT 10 begins to oscillate in response to CdS 7 receiving light from the object to be photographed and generates a pulse train as shown in FIG. 3. The pulse train appears at a point a on the first base $B_1$ of UJT 10. The period T between consecutive pulses of the pulse train, shown by FIG. 3, is generally expressed by $$T = R C \frac{1}{1 - \eta}$$

wherein R represents the inner resistance of CdS, C is the capacitance of the timing capacitor, and $\eta$ is the stand-off ratio of the UJT.

As the shutter release button of the camera is further depressed to effect a photographing operation, the switch 13, which drives the shutter, is closed and the first pulse of the pulse train is applied to the gate of the thyristor means 14 for starting operation of the leading shutter curtain. The thyristor 14 is turned ON and simultaneously the electromagnetic solenoid 16 is activated causing the leading shutter curtain to be released. Activation of the solenoid 16 causes the contact 22 to close and the timing capacitor 21 begins to be charged through the transistor 20. After elapse of a predetermined time dependent upon the internal resistance of transistor 20, there appears a pulse at a point b which is the first base $B_1$ of UJT 23. This pulse turns thyristor 26 ON whereby a point c on the cathode side of thyristor 26 reaches a predetermined voltage which is applied as a forward biasing voltage to the diode 28. The next pulse from the pulse train arrives through the capacitor 34 to the anode side of said diode 28 which is now forward biased and turns ON thyristor 29 to control the operation of the trailing shutter curtain. The electromagnetic solenoid 31 is then activated and releases the trailing shutter curtain to close the shutter. The time from the leading curtain release until the trailing curtain release may be varied by presetting the oscillation period of UJT 23 by means of the variable resistor 19 according to exposure factors such as ASA sensitivity. It should be noted that the oscillation period is also controlled by CdS 8 since the oscillation frequency of UJT 10 varies according to the light intensity at the photographed object and the exposure factor control circuit means must also be altered according to the light intensity at the photographed object.

For example, an exposure time of 1/100 sec. with respect to a photographed object of relatively high light intensity may be prolonged to an exposure time twice as long by setting the oscillation period of UJT to 1/50 sec. Similarly an exposure time of 1 sec. with respect to a photographed object of relatively low light intensity may be prolonged to an exposure time twice as long by setting the oscillation period of UJT 23 to 2 sec. In a similar manner, setting the oscillation period of UJT 23 for prolongation of the exposure time at the same ratio can be achieved depending on light intensity of a particular object to be photographed.

With the above arrangment the time point at which thyristor 29 is turned ON, thereby controlling the operation of the trailing shutter curtain, is dependent on exposure factors such as ASA sensitivity, and such operation may be delayed based on the particular exposure factor. Even when a film of low ASA sensitivity is used, it is possible to assure an appropriate exposure. It should be noted that the transistor 18 in FIG. 2 may be omitted and in such a case the junction between CdS 8 and the resistor 17 would be connected directly to the base of transistor 20.

Figure 4:
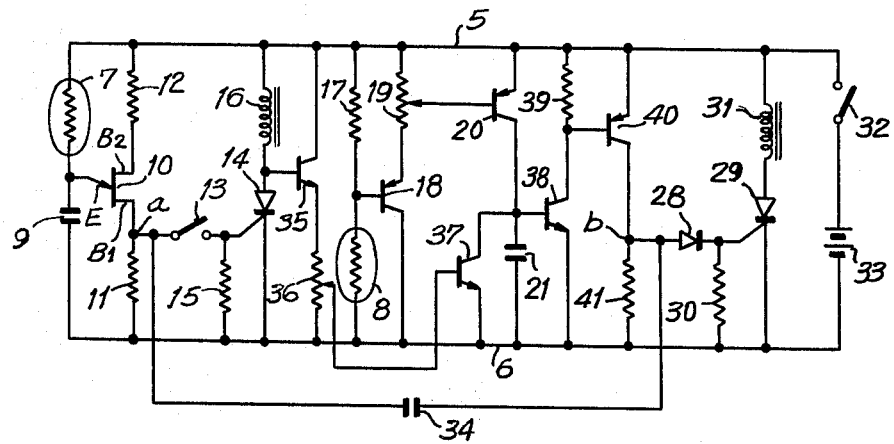

The wiring embodiment of FIG. 2 can be modified to eliminate the contact switch 22 and to replace it with a transistor switch across the capacitor 21. Also the UJT 23 can be replaced with standard transistor elements and in this manner thyristor 26 can be eliminated. Such a modification is shown in FIG. 4, wherein those parts identical to those shown in FIG. 2 are designated by the same reference numerals and description thereof is omitted. As is shown in FIG. 4, the base of transistor 35 is connected to the anode of thyristor 14, the collector thereof being connected to the positive bus 5, and the emitter thereof being connected to the negative bus 6 through a variable resistor 36. A slidable contact of the variable resistor 36 is connected to the base of a transistor 37 which acts as a shunt switch across capacitor 21. The emitter of transistor 37 is connected to the negative bus 6 and the collector thereof is connected to a junction between the collector of transistor 20 and the timing capacitor 21. The emitter of transistor 20 is directly connected to the positive bus 5. The collector of transistor 37 is also connected to the base of a switching transistor 38, the emitter thereof being connected to the negative bus 6 and the collector thereof being connected to the positive bus 5 through a resistor 39. The collector of transistor 38 is also connected to the base of a transistor 40, the emitter of which is connected to the positive bus 5, and the collector of which is connected to the negative bus 6 through a resistor 41. The collector of transistor 40 is also connected through the diode 28 to the base of thyristor 29 which operates the trailing shutter curtain.

The circuit of FIG. 4 operates as follows:

Upon closure of the source switch 32, there appears at the point $a$ a pulse oscillation whose frequency is a function of the light intensity at the photographed object. The timing capacitor 21, included in the exposure factor control circuit means is in a shunted state since the shunting transistor 37 is conducting. Thus, the transistors 38 and 40 are OFF and the point $b$ on the collector of transistor 40 is at the potential of the negative bus 6. Depressing the shutter button on the camera causes the switch 13 to be closed and the first pulse next appearing at the point $a$ turns ON the thyristor 14, causing the leading shutter curtain to operate. This first pulse is also applied through the capacitor 34 to the gate of the thyristor 29 but is blocked by the diode 28 which is reversed biased to prevent thyristor 29 from turning ON. When thyristor 14 turns ON, transistor 35 is turned OFF and, as a result, the transistor 37 is also turned OFF. The timing capacitor 21 now begins to be charged through the internal resistance of the transistor 20 and after elapse of a predetermined time based upon the values of the capacitor 21 and the internal resistance of transistor 20, the switching transistor 38 is turned ON, so that the transistor 40 is also turned ON and a predetermined voltage based upon the value of resister 41 appears at the point $b$ which is the collector of the transistor 40. This voltage serves to forward bias the diode 28 so that the arrival of the next pulse coming through the capacitor 34 to the point $b$ passes through the diode to the gate of the thyristor 29 to turn it ON, thereby activating the electromagnetic solenoid 31 to release the trailing shutter curtain. The switching time from the operation of the leading shutter curtain to the operation of the trailing shutter curtain is controlled in accordance with exposure factors such as ASA sensitivity. It should be noted here that CdS 8 functions in the same manner as heretofore discussed with respect to FIG. 2.

The wiring circuits of FIGS. 2 and 4 show arrangements according to the first system of this invention wherein the light measuring element is able to measure light intensity external to the camera. When the light measuring element is located internally such as in a single lens reflex camera, the light measuring element is blocked during the actual exposure and accordingly a memory circuit is included to retain the previously measured light intensity for use during exposure.

Figure 5:
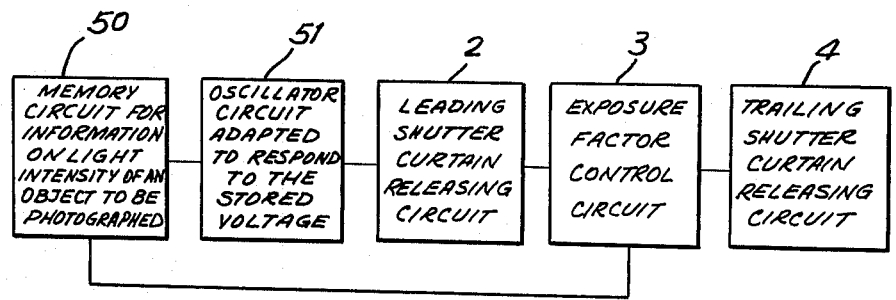

Referring now to FIG. 5 there is shown a block diagram of a modification of the first system utilizing an internally located light receiving element in conjunction with a memory circuit. Block 50 designates a circuit which stores as a voltage the information corresponding to light intensity at an object to be photographed. The oscillator circuit 51 is adapted to oscillate in response to the light intensity stored in the memory circuit 50 and produce a series of pulses whose frequency is a function of the voltage stored. The leading shutter curtain releasing circuit 2 responds to a pulse from the oscillator. The exposure factor control circuit means 3 begins timing a time duration based upon exposure factors introduced and is controlled by the voltage stored in the memory circuit. When the time duration has elapsed, a control pulse is sent to the trailing shutter curtain releasing circuit 4 to permit the trailing shutter curtain to close.

Figure 6:
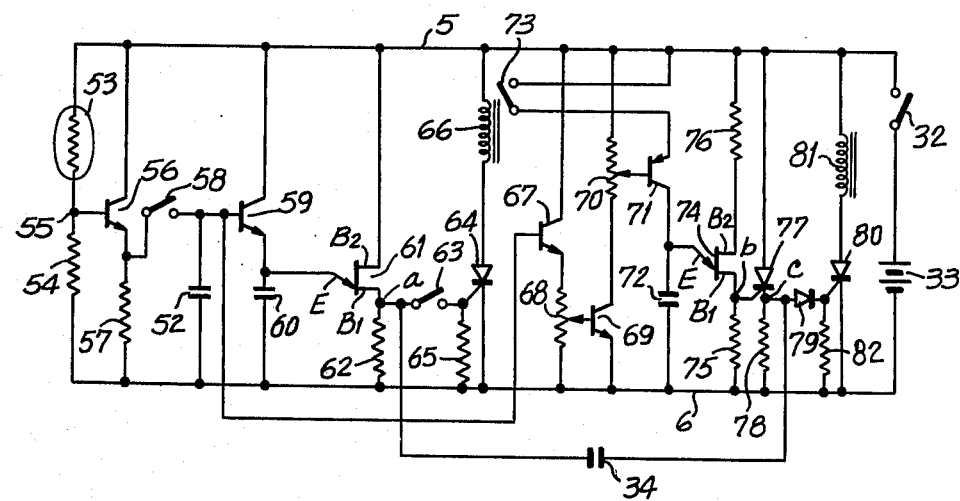

FIG. 6 shows one wiring arrangement of the block diagram in FIG. 5. In FIG. 6 parts common to the circuits previously described are designated by the same reference numerals. A CdS element 53 serves to detect light coming through the objective from an object to be photographed. A resistor 54 is in a series circuit arrangement therewith and the series circuit arrangement is connected between the positive and negative buses 5 and 6. The base of transistor 56 is connected to a junction of the series circuit arrangement. The collector of transistor 56 is connected to the positive bus 5, and the emitter thereof is connected to the negative bus 6 through a resistor 57. The emitter of transistor 56 is also connected through a normally closed switch 58 to the base of a transistor 59 having a high input impedance, switch 58 being opened when the shutter release button on the camera is depressed. A memory capacitor means 52 is connected between the base of transistor 59 and the negative bus 6. The collector of transistor 59 is connected to the positive bus 5 and the emitter thereof is connected to the negative bus 6 through a timing capacitor 60. The emitter of transistor 59 is connected to the emitter E of UJT 61 of which the first base $B_1$ is connected to the negative bus 6 through a resistor 62, and the second base $B_2$ is connected to the positive bus 5. The first base $B_1$ of UJT 61 is also connected to the gate of thyristor means 64 through a switch 63 which serves to open the shutter in response to depression of the shutter release button. Thyristor means 64 controls the operation of the leading shutter curtain. A resistor 65 is connected between the gate of thyristor 64 and the negative bus 6. The cathode of thyristor 64 is also connected to the negative bus 6, while the anode thereof is connected to the positive bus 5 through an electromagnetic solenoid 66 which operates the leading shutter curtain. The base of transistor 59 is connected to the base of a transistor 67, the collector of which is connected to the positive bus 5, while the emitter is connected to the negative bus 6 through a variable resistor 68. The slidable contact of the variable resistor 68 is connected to the base of transistor 69, the emitter thereof is connected to the negative bus 6, and the collector thereof is connected to the positive bus 5 through a variable resistor 70. The slidable contact of variable resistor 70 is connected to the base of a transistor 71, the collector of which is connected to the negative bus 6 through a timing capacitor 72, and the emitter of which is connected to the positive bus 5 through a switch 73 acting as an armature and adapted to be closed when solenoid 66 is activated. The collector of transistor 71 is connected to the emitter E of a UJT 74 of which the first base $B_1$ is connected to the negative bus 6 through a resistor 75 and the second base $B_2$ is connected to the positive bus 5 through a resistor 76. The first base $B_1$ of the UJT 74 is also connected to the gate of thyristor 77, the cathode of which is connected to the negative bus 6 through a resistor 78 and the anode of which is connected to the positive bus 5. The cathode of thyristor 77 is also connected to the gate of thyristor means 80 through a diode 79 having a polarity such that the anode of the diode is connected to the cathode of the thyristor. Thyristor 80 controls the operation of the trailing shutter curtain and has its cathode connected to the negative bus 6 and its anode connected to the positive bus 5 through an electromagnetic solenoid 81 which operates the trailing shutter curtain. The gate of thyristor 80 is connected to the negative bus 6 through a resistor 82. The first base $B_1$ of UJT 61 is connected to the capacitor 34 to provide the pulse to release the trailing shutter curtain.

The wiring arrangement shown in FIG. 6 operates as follows:

Upon closure of the source switch 32, CdS 53 responds to light coming through the objective from a photographed object. Information on light intensity obtained from the CdS 53 is stored through the normally closed switch 58 into the memory capacitor 52 and a train of oscillation pulses appear at the point $a$ on the first base $B_1$ of UJT 61. The pulses have a frequency based on the information voltage stored in capacitor 52. When the shutter release button is depressed further, the switch 63 is closed with switch 58 now being opened, so that the thyristor 64 is turned ON by the next successive pulse and the electromagnetic solenoid 66 is activated to release the leading shutter curtain and open the shutter. The pulses are also applied through the capacitor 34 to thyristor 80 but are blocked by the reverse biased diode 79 to prevent thyristor 80 from turning ON. When thyristor 64 is turned ON, and consequently the solenoid 66 is activated, the switch 73 is closed and transistor 71 becomes operative. Activation of transistor 71 starts to charge the timing capacitor 72 and, after elapse of a predetermined time based upon the capacitance value of capacitor 72 and the internal resistance of transistor 71, the UJT 74 is turned ON, resulting in appearance of a pulse at the point $b$ on the first base $B_1$ thereof and this pulse turns ON thyristor means 77. The cathode of thyristor 77 at the point $c$ then develops a predetermined potential based upon the value of resistor 78. This potential serves to forward bias the diode 79. The diode 79 is then easily turned ON upon arrival of the next pulse coming through the capacitor 34 from the UJT 61 and this next pulse is applied to the gate of the thyristor 80 for causing thyristor 80 to be turned ON. The electromagnetic solenoid 81 is thereby activated to release the trailing shutter curtain. It should be noted here that variable resitors 68 and 70 are used for setting ASA film speeds and other exposure factors.

Figure 7:
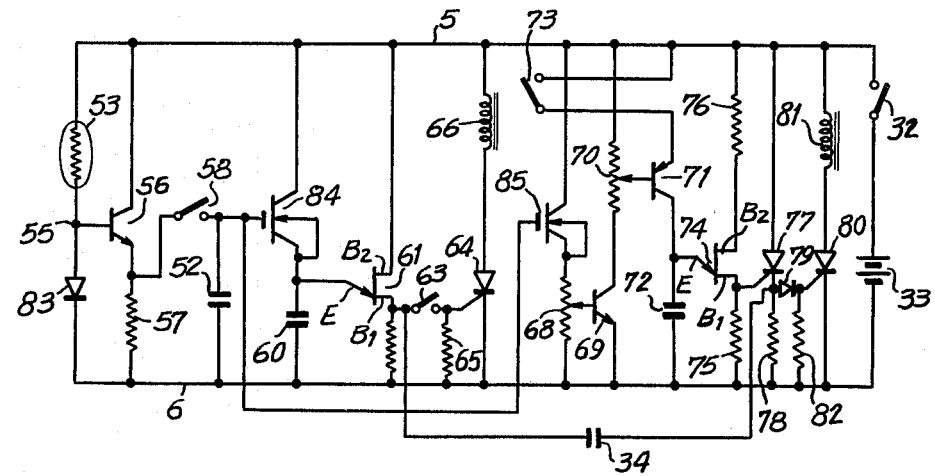

FIG. 7 shows a modification of the circuit of FIG. 6 replacing the resistor 54 by a diode 83 and the transistors 59, 67 by field effect transistors 84, 85. The circuit shown in FIG. 7 is an electric shutter of the inner light measuring type and includes logarithmic compression and expansion circuitry such that the voltage is stored at equal intervals with respect to the light intensity which is converted by CdS 53 as a series of multiples. The stored voltage in the memory capacitor 52 controls the oscillator circuit. If the oscillator circuit is of the linear type, the exposure time would also be established at equal intervals and consequently it would be impossible for the exposure time to be obtained in a series of multiples. Variation of the exposure in a series of multiples is therefore achieved by utilzing the non-linearity of the first effect transistor 84. The other field effect transistor 85 serves to control operation of the exposure factor control circuit also in the manner of a multiple series. It should be noted here that in all the circuits, in order to close the shutter, switches of the stationary type, such as transistors, could be used instead of the switches operating under action of electromagnetic solenoids.

PULSE-TERMINATING SYSTEM

Referring now to FIGS. 8–15 there is illustrated a second system of the invention wherein, after initiation of the release operation, the next subsequent pulse from the oscillator releases the leading shutter curtain. The oscillator pulses are then stopped for a time duration determined by the exposure factors. At the conclusion of the time duration, the oscillator again produces pulses the first of which serves to release the trailing shutter curtain.

Figure 8:
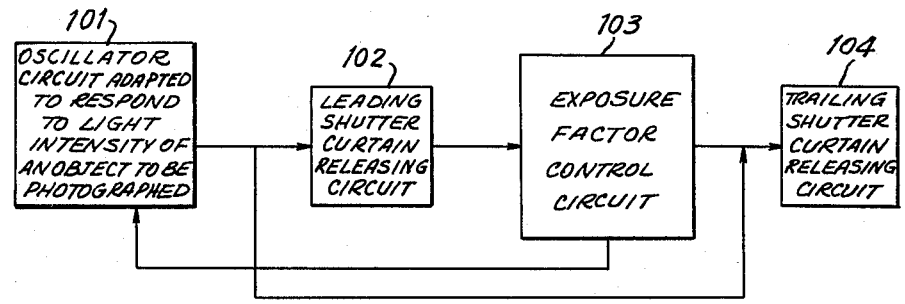
FIGS. 8–15 relate to a second system of the present invention wherein the oscillation pulses are stopped during the time duration representing the exposure factors, with FIG. 8 being a schematic block diagram illustrating the principle of operation of the second system of this invention.

In FIG. 8 there is shown a block diagram of the second system wherein block 101 designates an oscillator circuit means adapted to respond to light intensity at a photographed object for producing a series of pulses whose frequency is a function of the light intensity. A leading shutter curtain circuit 102 is released in response to one of the pulses. The exposure factor control circuit means 103 then stops the oscillator circuit from producing subsequent pulses until a given time duration has elapsed, whereupon a control signal is sent to the trailing shutter curtain release circuit means 104 and at the same time the oscillator means 101 again begins producing pulses. The next immediate pulse releases the trailing shutter curtain.

Figure 9:
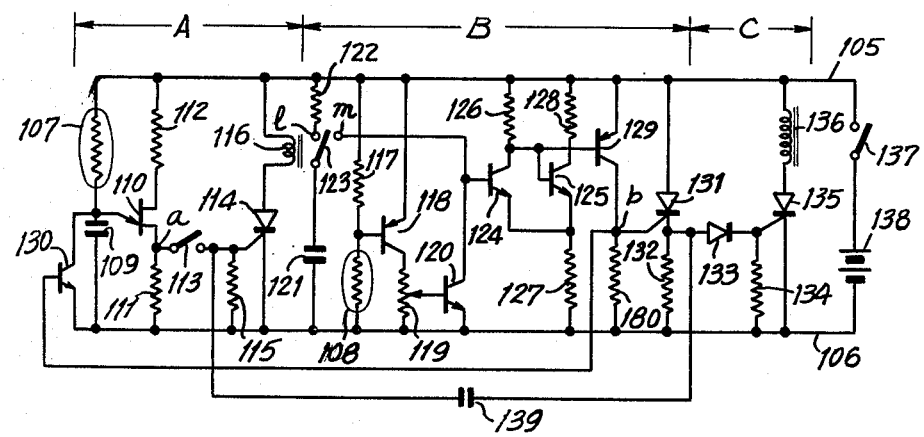

Referring now to FIG. 9 there is shown a wiring circuit arrangement corresponding to FIG. 8 wherein section A corresponds to a cascaded circuit consisting of an oscillator 101, adapted to respond to light intensity at a photographed object, and a leading shutter curtain circuit 102. Section B corresponds to the exposure factor control circuit means 103 and section C corresponds to the trailing shutter curtain release circuit means 104. A DC source 138 is connected in series with a source switch 137 to energize a positive bus 105 and a negative bus 106. Two CdS elements 107, 108 are adapted to detect the light intensity at a photographed object. A timing capacitor 109 is connected in series with CdS 107 between the positive bus 105 and the negative bus 106. A junction point of the series circuit is connected to the emitter of UJT 110 of which the first base and the second base are respectively connected through resistors 111 and 112 to the negative bus 106 and the positive bus 105. The first base of the UJT 110 is connected to the gate of the thyristor 114 through a switch 113 which controls opening of the shutter and is adapted to be closed upon depression of a shutter release button on the camera. The thyristor 114 controls the operation of the leading curtain shutter. The gate of the thyristor 114 is connected to the negative bus through a resistor 115. The anode of thyristor 114 is connected to the positive bus 105 through an electromagnetic solenoid 116 which releases the leading shutter curtain, and the cathode of thyristor 114 is connected to the negative bus 106. A series circuit arrangement consisting of a capacitor 121, an electromagnetic change-over switch 123 when in a normally closed position contacting contact l and a resistor 122, is connected between the positive and negative buses 105 and 106. Another series circuit arrangement consisting of CdS 108 and a resistor 117 is also connected between the positive and negative buses 105 and 106. A junction point between CdS 108 and the resistor 117 is connected to the base of a transistor 118 of which the emitter is connected to the positive bus 105 and the collector is connected to the negative bus 106 through a variable resistor 119 which is used for setting the ASA sensitivity. The slidable contact of the variable resistor 119 is connected to the base of transistor 120, the emitter of which is connected to the negative bus 106 and the collector of which connected to a normally opened contact m of change-over switch 123 as well as the base of transistor 124. The collector of transistor 124 is connected through resistor 126 to the positive bus 105, as well as to the bases of transistors 125 and 129. The emitters of the transistors 124 and 125 are both connected through a resistor 127 to the negative bus 106. The collector of transistor 125 is connected through a resistor 128 to the positive bus 105. The transistors 124 and 125 constitute a Schmitt circuit as it is known in the art. The emitter of the transistor 129 is connected to the positive bus 105 and the collector thereof is connected to the base of transistor 130, the gate of thyristor 131, and a resistor 180 whose other end is connected to the negative bus 106. The collector of transistor 130 is connected to a junction between the capacitor 109 and CdS 107 while the emitter thereof is connected to the negative bus 106. The anode of thyristor 131 is connected to the positive bus 105, and the cathode thereof is connected to a capacitor 139, the positive pole of a diode 133, and a resistor 132. The other end of capacitor 139 is connected to the gate of thyristor 114. The negative pole of diode 133 is connected to the gate of thyristor means 135 which controls the operation of the trailing shutter curtain. The other end of resistor 132 is connected to the negative bus 106. The gate of thyristor 135 is connected to the negative bus 106 through resistor 134. The cathode thereof is directly connected to the negative bus 106 and the anode thereof is connected to the positive bus 105 through an electromagnetic solenoid 136 which releases the trailing shutter curtain.

Figure 10:
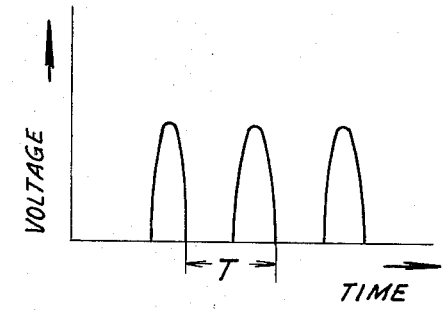

The operation of the circuit arrangement of FIG. 9 is as follows:

Upon closure of the source switch 137, the first transistor 125 is turned ON while the transistor 124 is OFF. The result is that the transistor 129 is also OFF, having its base supplied with voltage produced across the resistor 126 which is in the collector circuit of transistor 124. Accordingly, a zero voltage appears at point b across the collector resistor 180 of transistor 129 and the transistor 130 is also OFF since its base is supplied with voltage from the point b. The timing capacitor 109 can therefore be charged up and is charged with electric current flowing through CdS 107 whose internal resistance depends on the light intensity at the photographed object. Successive pulses whose frequency is a function of the light intensity appear at a point a across the resistor 111 of UJT 110. The pulses typically produced are shown in FIG. 10. When a shutter release button on the camera is further depressed to effect a photographing operation, the switch 113 is closed and pulse outputs are applied to the gate of thyristor 114 controlling the leading shutter curtain, and to the diode 133 associated with the trailing shutter curtain circuit. The first pulse after the close of switch 113 turns ON thyristor 114 and the electromagnetic solenoid 116 is activated to release the leading shutter curtain. Thyristor 135 on the other hand will be blocked by the reversed biased diode 133. The switch arm of the change-over switch 123 constructed as a relay armature normally closed onto the contact l, is reversed onto contact m as the electromagnetic solenoid 116 acting also as a relay, is activated, so that the electric charge of the capacitor 121 which has been previously charged from the DC source 138 through resistor 122, now flows through the internal resistance of transistor 120. As the capacitor 121 discharges, it energizes the base of the transistor 124 which causes the Schmitt circuit to reverse its state. When transistor 124 is turned ON, the transistor 129 is also turned ON, which causes a voltage to appear across the resistor 180 at point b. This voltage is applied to the gate of thyristor 131 which in turn causes a voltage across resistor 132 so that the diode 133 is forward biased. The voltage at point b also turns ON the transistor 130 which short circuits capacitor 109 so that oscillations from the UJT 110 is momentarily stopped and subsequent pulses are extinguished.

In this state, thyristor means 135 is not activated to release the trailing shutter curtain although it is in a state in which application of the next pulse from the oscillation would turn ON the diode 133 and the thyristor 135 which would be ready to respond. However, since the oscillator pulses have been extinguished, no pulses arrives at the thyristor 135. As the capacitor 121 discharges through the transistor 120 and the voltage thereon diminishes to less than a certain level, operation of the Schmitt circuit is reversed and accordingly operation of the transistor 129 also is reversed with the result that the voltage at the point b is again reduced to zero. The thyristor 131 remains conducting since once triggered it remains ON until the voltage across its anode to cathode is reduced. The transistor 130 however is turned OFF and the capacitor 109 again begins to be charged and the oscillator again produces pulses. The first pulse generated from the oscillator is applied through the switch 113 and the capacitor 139 to the diode 133 to turn it ON. A voltage is then applied to the gate of thyristor 135 so that the electromagnetic solenoid 136 is activated to release the trailing shutter curtain.

The time duration prior to release of the trailing shutter curtain may be varied by adjusting the internal resistance of transistor 120 which is achieved by setting the adjustable sliding contact of the variable resistor 119 according to the particular exposure factors, such as ASA sensitivity. The time duration may be also controlled by the CdS 108 adapted to be exposed to the light intensity of the photographed object since it is required to vary the control time of the exposure factor control circuit in accordance with the particular light intensity at the photographed object because the oscillation frequency of the UJT 110 varies according to the particular light intensity at the photographed object.

The time taken to turn ON the thyristor 135, which controls the operation of the trailing shutter curtain, may be appropriately set in accordance with the particular exposure factors such as ASA sensitivity as heretofore described so that it is possible to obtain an appropriate exposure over a considerable range of variation in exposure factors such as ASA sensitivity of the film used.

Figure 11:
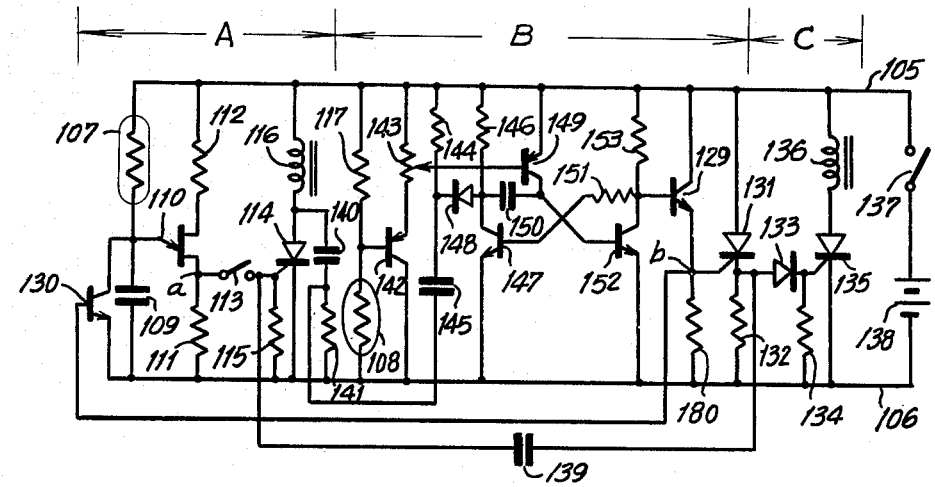

Referring now to FIG. 11 there is shown another wiring arrangement of the block diagram of FIG. 8, wherein the Schmitt circuit heretofore shown in FIG. 9 is replaced by a monostable multivibrator circuit means to constitute the exposure factor control circuit. Those parts of FIG. 11 common to that of FIG. 9 are designated by common reference numerals without description thereof in detail. A differential capacitor 140 and a differential resistor 141 are connected in series between the anode of thyristor 114 and the negative bus 106. The junction point between the CdS 108 and the resistor 117 is connected to the base transistor 142, the collector of which is directly connected to the negative bus 106 and the emitter of which is connected to the positive bus 105 through a varaible resistor 143 which is used for setting of the ASA sensitivity or other exposure factors. A capacitor 145 and a resistor 144 are connected in series to a junction between capacitor 140 and resistor 141 and to the positive bus 105. Transistor 147 together with resistor 146 and transistor 152 together with resistor 153, are each serially connected, respectively, between the positive and negative buses 105 and 106. The sliding contact of the variable resistor 143 is connected to the base of a transistor 149, the collector of which is connected to the base of the transistor 152 and the emitter of which is connected to the positive bus 105.

Diode 148 is connected with its cathode coupled to a junction between the resistor 144 and the capacitor 145 and with its anode coupled to the collector of transistor 147. A capacitor 150 is connected between the collector of transistor 147 and the base of transistor 152. A resistor 151 is connected between the base of transistor 147 and the collector of transistor 152. The transistors 147 and 152 constitute a monostable multivibrator circuit means. The collector of transistor 152 is connected to the base of transistor 129.

The circuit shown in FIG. 11 operates as follows:

Upon closure of the source switch 137, the transistor 152 constituting part of the monostable multivibrator is turned ON due to its internal characteristics and the transistor 129 is turned OFF since it receives at its base the collector voltage of transistor 152. There is no voltage at the emitter of transistor 129 designated at point b, and, therefore, the thyristor 131 is OFF, and the transistor 130 is also OFF since its base receives the voltage appearing at the point b. As a result, the timing capacitor 109 begins to charge through the CdS 107 which in turn is exposed to light intensity from the photographed object, and the UJT 110 begins to oscillate. Successive photoresponsive pulses therefore appear at the point a across the resistor 111. When the shutter release button on the camera is further depressed to effect photographing operation, the switch 113 is closed and the next successive pulse causes the leading shutter curtain to be released. The trailing shutter curtain, however, remains locked as in the previously described circuit of FIG. 9. When thyristor 114 is turned ON, the electic charge previously stored in the differential capacitor 140 is discharged through thyristor 114 with a result that a negative pulse appears across the differential resistor 141. The negative pulse is applied through a coupling capacitor 145 to a diode 148 which triggers the monostable multivibrator circuit to instantaneously reverse its state whereby the transistor 152 is turned OFF. Consequently, the transistor 129 is turned ON and a voltage appears at the point b, causing the thyristor 131 to turn ON and the diode 133 to be forward biased. At the same time the voltage at the point b is also applied to the base of the transistor 130 to turn ON transistor 130 thereby short circuiting capacitor 109 so that oscillation of the UJT 110 is stopped and subsequent pulses are extinguished, as in the previous circuit. The oscillator remains stopped until operation of the monostable multivibrator is automatically reversed due to its own characteristics for a time determined by a time constant corresponding to a product of the internal resistance of the transistor 149 and the capacity of the capacitor 150. The slidable contact of the variable resistor 143 may be therefore set in accordance with the particular exposure factors, such as the ASA sensitivity, and thereby the internal resistance of the transistor 149 may be controlled so as to determine when the oscillation of the UJT 110 again starts, thereby releasing the trailing shutter curtain.

Figure 12:
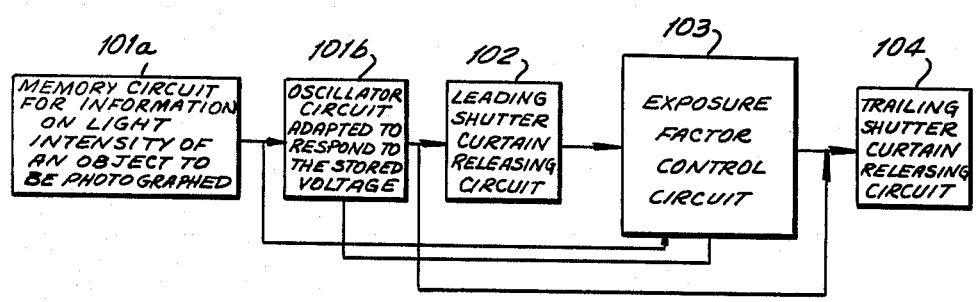

The wiring circuits of FIGS. 8–11 have the above-described arrangements according the second system of the invention wherein the light measuring elements were able to measure light intensity external to the camera. The second system can be modified to accommodate a light measuring element located internally of the camera and recieving the light through the objective. FIG. 12 is a block diagram showing the modified arrangement in which block 101a designates a memory circuit adapted to store, as a voltage, information of the light intensity at an object to be photographed. Block 101b is an oscillator circuit adapted to respond to the stored voltage. The other elements are common to those heretofore described in the block diagram of FIG. 8.

Figure 13:
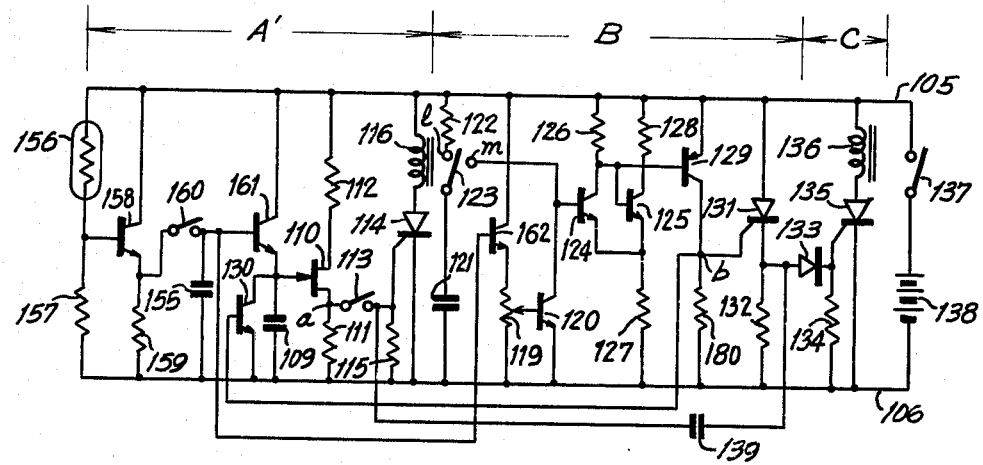

Referring now to FIG. 13 which illustrates a wiring diagram of one arrangement of the block diagram of FIG. 12, a section A' corresponds to a cascade circuit consisting of the memory circuit means 101a adapted to store, as a voltage, information of light intensity at an object to be photographed, the oscillator circuit 101b adapted to respond to the stored voltage, and a leading curtain release circuit 102. Sections B and C are essentially the same as that of FIG. 11.

A CdS 156 adapted to detect light coming through the objective from a photographed object is connected in series with a resistor 157 between the positive and negative buses 105 and 106. A junction point of this series circuit is connected to the base of transistor 158, the collector of which is connected to the positive bus 105 and the emitter of which is connected to the negative bus through a resistor 159. The emitter is also connected through a normally closed switch 160 to the base of a transistor 161, and a memory capacitor 155 is connected between the base of the transistor 161 and the negative bus 106. The collector of the transistor 161 is connected to the positive bus 105 and the emitter thereof is connected to the timing capacitor 109, the collector of transistor 130, and the emitter of the UJT 110. The junction point between the base of the transistor 161 and the memory capacitor 155 is connected to the base of transistor 162, the collector of which is connected to the positive bus 105 and the emitter of which is connected to the variable resistor 119 which is used for setting the ASA sensitivity or other exposure factors.

The remainder of the circuit arrangement is similar to FIG. 9 and the parts common to those in FIG. 9 are designated by common reference numerals without further description in detail.

The wiring circuit of FIG. 13 operates as follows:

Upon closure of the source switch 137, the CdS 156 which is exposed to light coming through the objective of the camera from an objective being photographed provides a voltage, in accordance with the light intensity of the photographed object which is applied through the transistor 158 across opposite ends of the resistor 159. This voltage is stored into the memory capacitor 155 through the normally closed switch 160 and, based on this stored voltage, successive oscillation pulses as illustrated in FIG. 10 appear at the point a representing the first base of UJT 110.

Upon continued depression of the camera shutter release button, swtich 160 opens and the shutter driving switch 113 is closed. The next successive pulse from the oscillator turns ON the thyristor 114 and thereby energizes the electromagnetic solenoid 116 causing the leading shutter curtain to be released. This pulse is also applied through the capacitor 139 to the trailing shutter curtain circuit but is blocked by the reverse bias of the dioe 133 preventing thyristor 135 from turning ON. When the thyristor 114 is turned ON, and the solenoid 116 is energized, the change-over switch 123 is attracted from its normally closed contact l onto contact m and the electric charge of the capacitor 121 which has been previously charged from the DC source 138 through the resistor 122 is applied to the base of the transistor 124. The Schmitt circuit, consisting of the transistors 124 and 125 which receives the electric charge, and the circuit including the transistor 129 operate in the same manner as in the embodiment of FIG. 9 so that opposite ends of the resistor 132 inserted into the cathode side of the thyristor 131 receives a voltage across it and this voltage forward biases the diode 153. The voltage appearing at the point b of the resistor 180, inserted into the collector side of the transistor 129, turns ON the transistor 130 short-circuiting the capacitor 109 so that oscillations from the UJT 110 are stopped and the subsequent pulses are extinguished. Accordingly, the trailing shutter curtain is not released.

However, as the capacitor 121 is further discharged through the transistor 120, the Schmitt circuit is again reversed to that transistor 130 is turned OFF and the capacitor 109 begins charging again whereby the oscillator now begins producing pulses. The first pulse generated therefrom is applied to turn ON the diode 133 through the switch 113 and the capacitor 139 so that the thyristor 135 is activated to energize the electromagnetic solenoid 136 to thereby release the trailing shutter curtain.

The time duration until the trailing shutter curtain operates can be varied by setting the sliding contact of the variable resistor 119 according to exposure factors such as ASA sensitivity. The voltage stored in the memory capacitor 155 is applied to the base of the transistor 162, and effects the desired control since the voltage is related to the light intensity of the object to be photographed.

Figure 14:
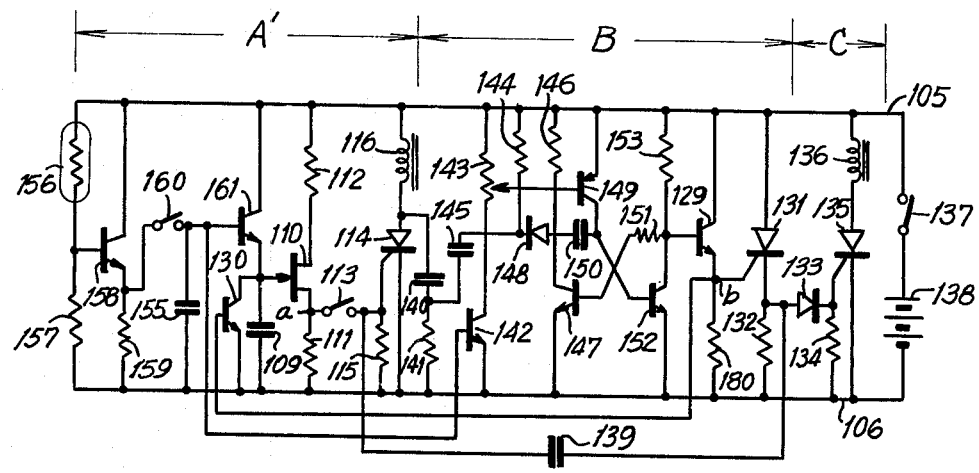

Referring now to FIG. 14 there is shown a modification of the above circuit wherein section A' is identical to section A' in FIG. 13, and sections B and C are identical to the sections B and C in FIG. 11, respectively. Thus a monostable multivibrator is utilized together with the internally located light receiving element. The circuit of FIG. 14 thus achieves an operation similar to that of the circuit shown in FIG. 13 and the parts common to those in FIGS. 11 and 13 are designated by the common reference numerals without any description thereof in detail.

Figure 15:
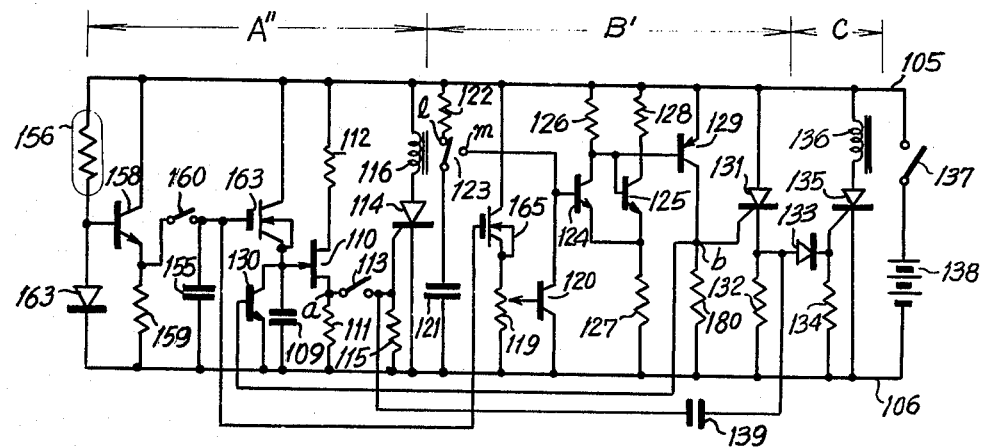

Referring now to FIG. 15 there is shown a modification of the second system of this invention including logarithmic compression and expansion circuitry together with an internally located light measuring element wherein the resistor 157 in FIG. 13 is replaced by diode 163, and the transistors 161 and 162 are replaced by field effect transistors 164 and 165. Section A'' provides the circuitry to logarithmically compress and store information on the light intensity at the object being photographed. It further includes an oscillator circuit adapted to respond to and expand the logarithmically compressed stored voltage and also a leading shutter curtain releasing circuit. Section B' includes circuitry to expand the logarithmically compressed stored voltage and to control exposure factors. The light intensity of the object which is photographed varies according to a geometric progression, by increasing in a series of multiples. However, because of the non-linear effect of the CdS element 156 and the diode 163, the voltaged converted from light intensity will be in accordance with an arithmetic progression and increase at equal intervals. This converted voltage is stored in the memory capacitor 155 and used to control the oscillator circuit. If the oscillator element is linear, the shutter exposure time would also be at equal intervals and could not be obtained in a series of multiples.

In order to vary the shutter time in a series of multiples, the non-linearity of the field effect transistor 164 is utilized. Another field effect transistor 165 is also utilized to obtain a similar effect on the exposure factor control circuit so that it too can vary as a series of multiples.

Another modification of the second system could be had by modifying the circuit of FIG. 14 to include logarithmic compression and expansion circuitry by replacing the transistors 161 and 142 in FIG. 14 by field effect transistors.

The change-over switch 123 activated by the energized solenoid 116 which is used for the leading shutter curtain release in the heretofore discussed circuitry illustrated in FIGS. 9, 13 and 15 may be effectively replaced by a switch of the stationary type such as, for example, a semiconductive element.

It is possible to incorporate the embodiments described above in FIGS. 1–15 into a limited space such as that available in a small camera without any difficulty, inasmuch as a number of capacitors as conventionally required for determining exposure may be omitted. In addition, the structure of the invention is of extremely low cost inasmuch as there is no requirement for a capacitor of negligible leakage current.

Furthermore, it is possible to obtain proper exposure of a continuous range and in an extremely precise manner even in the event that it is required to overexpose or underexpose the film or when the film is of a reduced sensitivity, inasmuch as exposure control, such as the ASA film speed, may be achieved by way of a variable resistor. In addition, it is possible to change the exposure-determining factors without necessitating the use of a switch.

Particularly with embodiments as illustrated in FIGS. 7 and 15 where the exposure-determining factor, such as film speed, is rendered effective at the stage of logarithmic expansion, the error which may be present in connection with the exposure controls may advantageously be reduced to a minimum, as compared with the situation where the exposure-determining factors are rendered effective at the logarithmic compression stage with a small converted voltage at equal intervals.

FLIP-FLOP SYSTEM

Referring now to FIGS. 16 to 21 a third system of the invention will now be described. In this embodiment a first pulse from the oscillator activates the release of the leading shutter curtain. The first pulse and subsequent pulses are applied to a flip-flop circuit having a plurality of cascaded flip-flops. A particular output from a flip-flop is selected in accordance with a particular exposure factor. When the particular flip-flop produces an output, that output releases the trailing shutter curtain, or that output is used to permit the next subsequent pulse from the oscillator to release the trailing shutter curtain.

Figure 16:
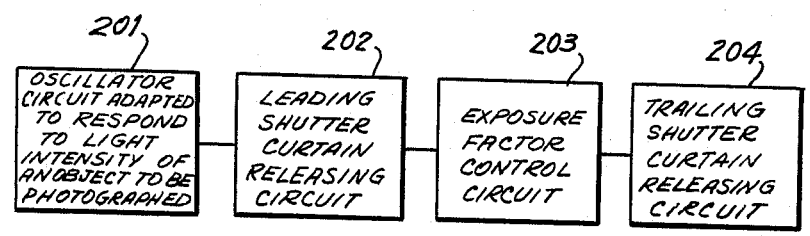

Referring now to FIG. 16 there is shown a general block diagram of this system of the invention. Block 201 designates a photo-responsive oscillator circuit means adaptd to produce a series of pulses whose frequency is a function of the light intensity of an object to be photographed. A leading shutter curtain releasing circuit 202 is adapted to be activated with a pulse from the oscillator circuit 201. An exposure factor control circuit means 203 comprising flip-flops is adapted to be activated with pulses from the oscillator circuit means 201. A trailing shutter curtain releasing circuit 204 is adapted to be adtivated in cooperation with an output from the exposure factor control circuit 203.

Figure 17:
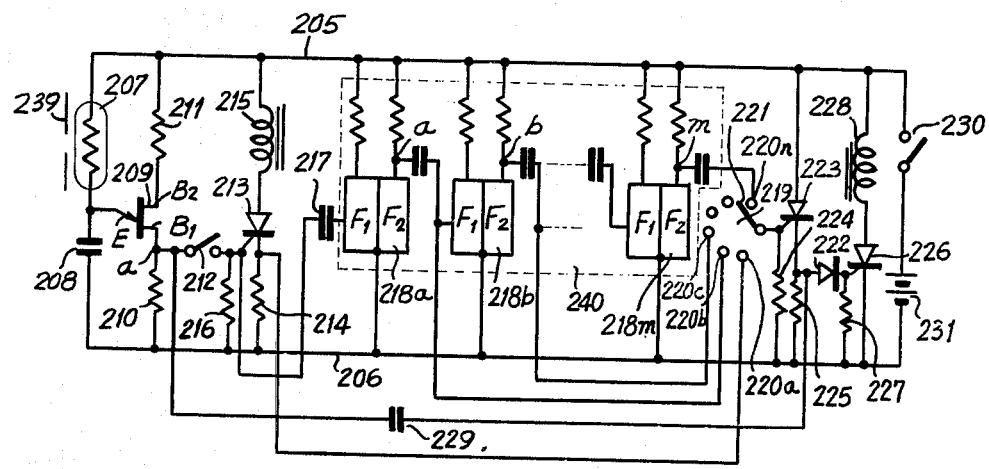

A wiring circuit of one possible arrangement of the third system is shown in FIG. 17. Referring to FIG. 17 a DC source 231 is connected in a series circuit arrangement with a source switch 230. The series circuit is connected across a positive bus 205 and a negative bus 206. A further series circuit arrangement consisting of a CdS 207, adapted to detect light intensity at an object to be photographed, and a timing capacitor 208 is connected between the positive and negative buses 205 and 206. A junction point of the last-mentioned series circuit arrangement is connected to the emitter E of UJT 209 of which the first base $B_1$ is connected to the negative bus 206 through a resistor 210 and the second base $B_2$ is connected to the positive bus 205 through a resistor 211. The first base $B_1$ of the UJT 209 is also connected to the gate of thyristor means 213 through a shutter driving switch 212 adapted to be closed during depression of a shutter release button on the camera. The cathode of thyristor 213 is connected to the negative bus 206 through a resistor 214, and the anode thereof is connected to the positive bus 205 through an electromagnetic solenoid 215 which releases the leading shutter curtain. The gate of thyristor 213 is connected to the negative bus 206 through a resistor 216 and also through a coupling capacitor 217 to the input terminal of the first flip-flop (hereinafter referred to as FF) 218a of cascade-like connected series of FFs 218a, 218b . . . 218n. Outputs of the FFs 218a, 218b, . . . 218n are respectively connected to associated fixed contacts 220b, 220c . . . 220n of a change-over switch 219 for selecting the proper ASA sensitivity or other exposure factor. A movable contact 221 of the switch 219 is connected to the gate of thyristor 223 which controls the biasing voltage of diode 222. The gate and the cathode of thyristor 223 are respectively connected through resistors 224 and 225 to the negative bus 206, and the anode thereof is connected to the positive bus 205. The anode of diode 222 is connected to the cathode of thyristor 223, and the cathode of diode 222 is connected to the gate of thyristor means 226 which controls the operation of the trailing shutter curtain. The gate of thyristor 226 is connected to the negative bus 206 through a resistor 227. The anode of thyristor 226 is connected to the positive bus 205 through an electromagnetic solenoid 228 which releases the trailing shutter curtain. The anode of diode 222 is connected through a coupling capacitor 229 to the first base $B_1$ of UJT 209. The fixed contact 220a of the change-over switch 219 is connected to the cathode of thyristor 213. A diaphragm 239 is shown schematically in front of CdS 207.

The wiring circuit as shown in FIG. 17 operates as follows:

Upon closure of the source switch 230, pulses appear on the first base $B_1$ of UJT 209, the frequency of the pulses depending on light intensity at the object to be photographed. During an initial part of the depression of a shutter release button on the camera, prior to actual exposure, the switch 212 is closed and the next occurring pulse is applied to the gate of the thyristor 213 to make it conductive. The electromagnetic solenoid 215 is thereby energized to release the leading shutter curtain to start the exposure and to set FF 218a. Upon arrival of the next pulse at the input terminal of FF 218a, FF218b is reset to generate an output pulse and held in this state until the next pulse is generated from the oscillator. Upon arrival of the next following pulse at the input of FF 218a, another output pulse is generated from FF 218a and FF 218b is reset to generate an output pulse at the output terminal b. Thus upon arrival of successive input pulses at FF 218a, output pulses are successively generated from FFs 218c, 218d, ... 218n. It is seen that output pulses are respectively generated from FFs 218a, 218b, 218c ... 218n in response to the input pulses at a binary rate of $2^1, 2^2, 2^3, \ldots 2^n$ respectively. More specifically, FF 218a generates an output pulse with every second input pulse, FF 218b generates an output pulse with every fourth input pulse, FF 218c generates an output pulse with every eighth input pulse, etc. With such an arrangement of FFs in cascade connection, the number of flip-flops is set onto the change-over switch 219 in accordance with the ASA sensitivity. Light intensity of an object to be photographed usually varies as a function of $2^{LV}$, where the value of LV is a natural number such as 1, 2, 3, ... n. The number of flip-flops may therefore be selected according to the LV value for an effective control of exposure factors. Assuming that the movable contact 221 of the change-over switch 219 is connected to the fixed contact 220a, it is understood from FIG. 17 that, as soon as the leading curtain is released by the first pulse, the thyristor 223 is turned ON and a forward bias voltage is applied to the diode 222, so that upon arrival of the next pulse, the thyristor 226 is turned ON to control the trailing shutter curtain. However, when the film speed is relatively low and there is possibility of under-exposure, the movable contact 221 of the change-over switch 219 can be connected to the fixed contact 220b. The first pulse then releases the leading shutter curtain and at the same time sets FF 218a. Upon arrival of the next pulse, FF 218a is reset to generate an output pulse at the output terminal a. This pulse turns ON the thyristor 223 and causes a forward bias voltage to be applied to the diode 220. Upon arrival of the third pulse, the thyristor 226 is turned ON by the diode 222 to control the trailing shutter curtain. This process is illustrated in FIGS. 18 – 19 wherein v represents the voltage, t the time and $T_1$ and $T_2$ shutter opening times.

Figure 18:
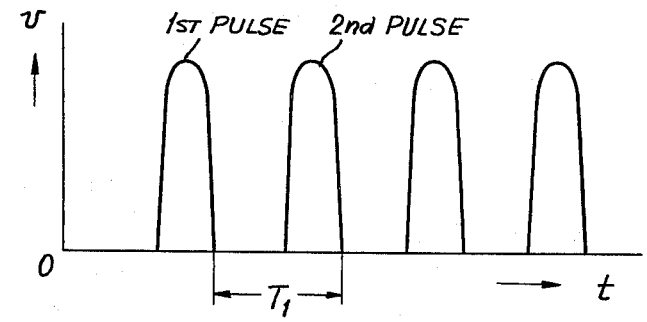
Figure 19:
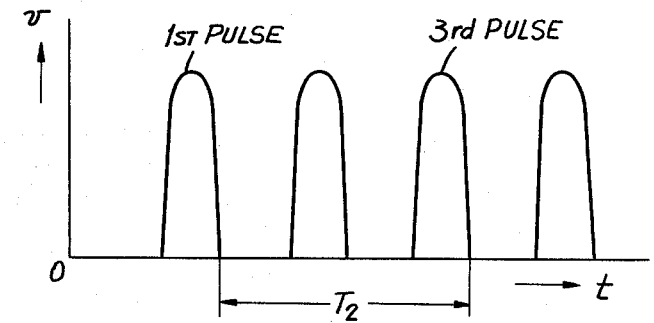

As seen from FIGS. 18 and 19, the change-over switch 219 may be switched in accordance with film speed to obtain an appropriate exposure of the film.

In the wiring arrangement of FIG. 17, after the flip-flop selected has produced an output pulse, the next subsequent oscillator pulse is used to release the trailing shutter curtain. However, it is possible to modify this arrangement wherein the output from the flip-flops itself acts to release the trailing shutter curtain.

Figure 20:
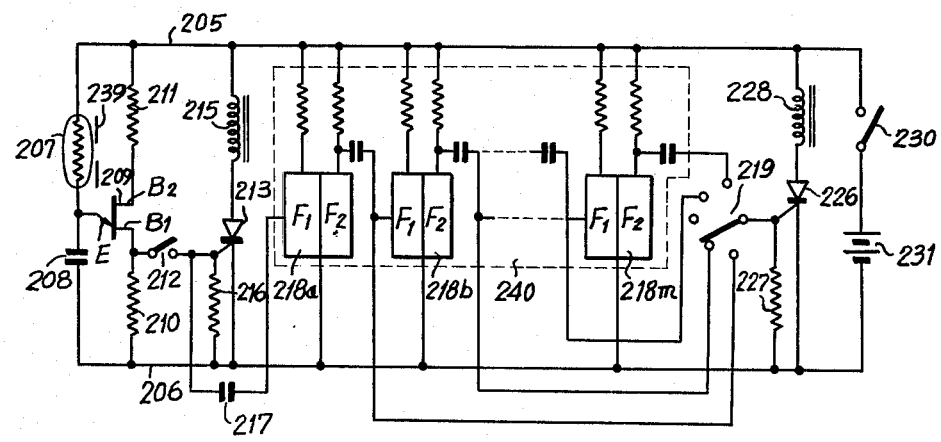

Referring now to FIG. 20, the above mentioned modification of FIG. 17 is shown wherein the diode 222, the thyristor 223, the capacitor 217 and the resistors 224 and 225 are omitted, and the cathode of the thyristor 213 is not connected to the fixed contact 220a of the change-over switch 219. The rest of the circuit of FIG. 20 is identical to that of FIG. 17. The circuit shown by FIG. 20 operates in the same manner as that of FIG. 17 and, therefore, description thereof is here omitted. It should be noted, however, that in this circuit the thyristor 226 controlling the trailing curtain is directly turned ON by the output pulse from the FF's.

Figure 21:
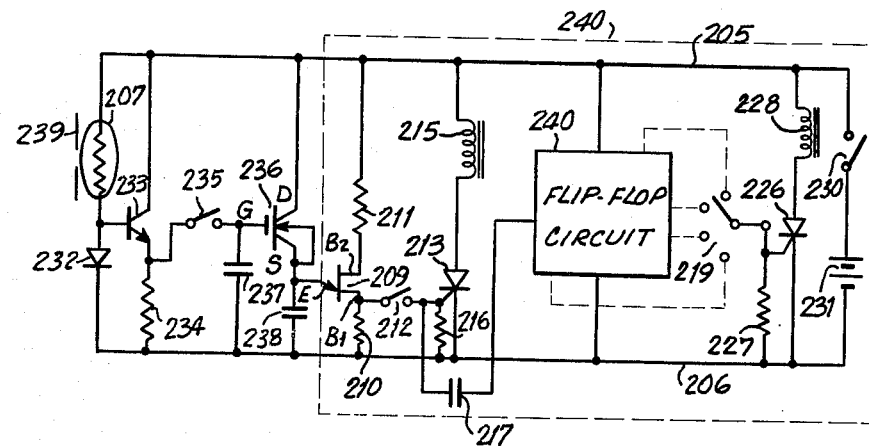

The above circuits can further be modified to accommodate a photosensitive element located internally of the camera and to include logarithmic compression and expansion circuitry. Referring now to FIG. 21, such modifications are shown wherein CdS 207 is disposed in the path of light coming through the objective from a photographed object and a logarithmic compression diode 232, having a polarity as shown, is serially connected to CdS 207. The series circuit arrangement is connected between the positive and negative buses 205 and 206. A junction point of this series circuit arrangement is connected to the base of transistor 233. The collector of transistor 233 is connected to the positive bus 205 and the emitter thereof is connected to the negative bus 206 through resistor 234. The emitter of transistor 233 is also connected through a normally closed switch 235 to the gate of a field effect transistor (FET) 236 adapted to be activated as a logarithmic expansion element. The gate of FET 236 is connected to the negative bus 206 through a memory capacitor 237. The drain of FET 236 is connected to the positive bus 205, and the source thereof is connected to the negative bus 206 through a timing capacitor 238. The section shown enclosed by the broken lines 240 includes a circuit identical to that of FIG. 20 with the elimination of CdS 207 and the capacitor 208. The source of FET 236 is connected to the emitter E of the UJT 209.

The circuit shown in FIG. 21 operates in the following manner:

Information on light intensity at an object to be photographed, which is detected by the CdS 207, is logarithmically compressed by the diode 232 and stored in the memory capacitor 237. The information stored in the memory capacitor 237 is expanded by FET 236. UJT 209 produces a series of pulses at the base $B_1$ thereof which has a frequency controlled by the timing capacitor 238 and the internal resistance of FET 236. The FET internal resistance in turn is dependent upon the light intensity. The series of pulses then activate the FF circuit as in FIG. 20.

With the aforementioned third system of the invention, the oscillator circuit means may be sufficiently simplified to be easily incorporated directly into the camera body since the oscillation frequency is only based on the variation of light intensity of the photographed object. Exposure factor control may be simply and easily achieved since such control is carried out after the oscillations are produced. Furthermore, it is possible to effect the exposure factor control at a stage of logarithmic expansion. The fact that the output from the flip-flops varies as powers of $2^n$ is advantageous in that an exposure factor of extremely high precision may be set by selecting the number of flip-flops in accordance with the exposure factor value. This characteristic may be used to overcome any disadvantageous influence of the variation in temperature as well as source voltage on the internal circuit elements.

As heretofore mentioned, the output from the flip-flops correspond to the LV values in that they produce outputs in series of powers of two so that the exposure factor may be easily set by selecting the number of flip-flops according to the LV value. Precision of the exposure factor may be improved by the use of logic components and utilizing integrated circuits to realize such components.

PULSE STORAGE SYSTEM

A fourth system of this invention is shown and described with reference to FIGS. 22 to 33. In this system the shutter is opened with one of the oscillator pulses.

This pulse and subsequent pulses are cumulatively stored as a voltage until the cumulative stored voltage corresponds to a predetermined value corresponding to a desired exposure factor. The shutter is then closed with the pulse which produces the coresponding value or with the next immediately following pulse.

Figure 22:
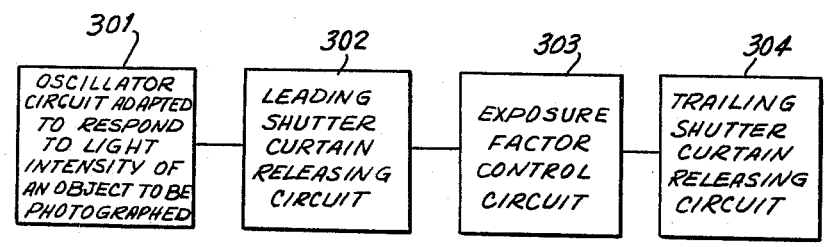

Referring now to FIG. 22 there is shown a block diagram of the fourth system of the invention. An oscillator circuit 301 is adapted to oscillate in response to light coming from an object to be photographed. A leading shutter curtain release circuit 302 is controlled by one of the pulses to open the circuit. An exposure factor control circuit 303 receives the pulses and stores them cumulatively. When a predetermined value is reached, the trailing shutter curtain release circuit 304 is controlled to close the shutter.

Figure 23:
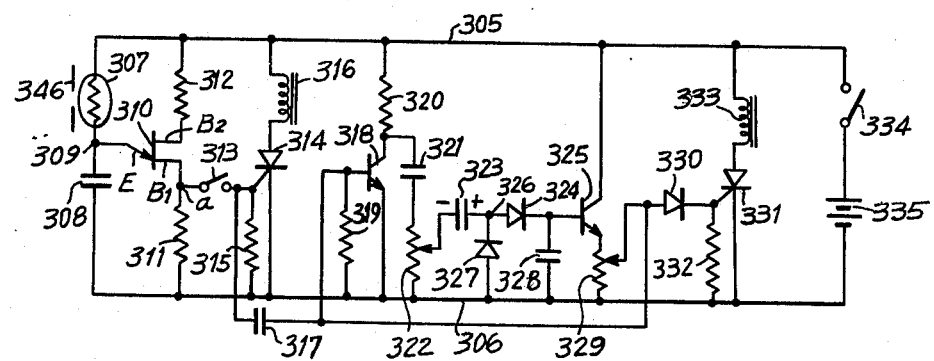

A wiring diagram according to the fourth embodiment is shown in FIG. 23. A source 355 in series with a source switch 354 is connected between a positive bus 305 and a negative bus 306. A further series circuit consisting of a timing capacitor 308 and CdS 307, which is adapted to detect the light intensity at a photographed object, is inserted between the buses 305 and 306. A junction point 309 of this last-mentioned series circuit is connected to the emitter E of UJT 310, the first base $B_1$ of which is connected to the negative bus 306 through a resistor 311 and the second base $B_2$ of which is connected to the positive bus 305 through a resistor 312. The first base $B_1$ of the UJT 310 is also connected to the gate of thyristor 314 through a switch 313 adapted to be closed during depression of the shutter release button of a camera. The thyristor 314 controls the leading shutter curtain. The gate of thyristor 314 is connected to the negative bus 306 through a resistor 315. The cathode of the thyristor 314 is connected to the negative bus 306 and the anode thereof is connected to the positive bus 305 through an electromagnetic solenoid 316 which releases the leading shutter curtain. The gate of the thyristor 314 is also connected to the base of transistor 318 through capacitor 317. The transistor 318 is included in the exposure factor control circuit means 303 and the base thereof is also connected to the negative bus 306 through a resistor 319. The emitter of transistor 318 is directly connected to the negative bus 306, and the collector thereof is connected to the positive bus 305 through a resistor 320. The collector is also connected to the negative bus 306 through a differential circuit including a capacitor 321 in series with a variable resistor 322. The sliding contact of variable resistor 322 is connected to the base of a high input impedance transistor 325 through a series circuit including a capacitor 323 and diode 324 having its anode coupled to capacitor 323. The junction point 326 of this series circuit is connected to the negative bus 306 through a diode 327 having its cathode coupled to the capacitor 323. The base of a transistor 325 is connected to the negative bus 306 through a storing capacitor 328 and the emitter thereof is connected to the negative bus 306 through a variable resistor 329. The collector of transistor 325 is directly connected to the positive bus 305. The slidable contact of variable resistor 329 is connected to the gate of thyristor 331 through a diode 330 having its anode coupled to the slidable contact. Thyristor means 331 controls the operation of the trailing shutter curtain. The slidable contact of variable resistor 329 is also connected to the base of transistor 318. The gate of thyristor 331 is also connected to the negative bus 306 through resistor 332 and the cathode thereof is directly connected to the negative bus 306. The anode of thyristor 331 is connected to the positive bus 305 through an electromagnetic solenoid 333 which when energized, releases the trailing shutter curtain. A diaphragm 346 is schematically shown in front of the CdS 307.

The wiring diagram shown in FIG. 23 operates as follows:

Upon closure of the source switch 334 continuous pulses appear at a point $a$ on the first base $B_1$ of the UJT 310 in response to light intensity at the phtotgraphed object. Depression of the shutter release button on the camera closes the switch 313, and the next immediately following pulse to the gate of thyristor 314 turns it ON, thereby energizing electromagnetic solenoid 316 which releases the leading shutter curtain. The thyristor 331 which controls the trailing shutter curtain is blocked from receiving this or subsequent pulses by its reversed biased diode 330. The pulses passing through the capacitor 317 are applied to the base of the transistor 318 to turn it ON. The capacitor 321 which had been previously charged through resistor 320 can now discharge through transistor 318 so that negative pulses appear across variable resistor 322. As a result of these negative pulses, the cathode side of the diode 327 is reversed to a negative polarity and the diode 327 is turned ON, resulting in the charging of capacitor 323 with a polarity as shown. During the time interval between pulses, when there is no pulse appearing at the point $a$ of UJT 310, transistor 318 is turned OFF and the capacitor 321 again begins to be charged.

During the charging of capacitor 321 the variable resistor 322 generates pulses of positive polarity which turns ON the diode 324 and the storing capacitor 328 begins to be charged with the positive pulse. When the next pulse arrives from UJT 310 to the base of the transistor 318, transistor 318 is again turned ON and the operation repeats itself whereby pulses are stored in storing capacitor 328.

The stored pulse voltage appears at the emitter of the emitter follower transistor 325. This voltage is divided by the variable resistor 329 which is preset according to particular exposure factors, and the divided voltage is applied to forward bias diode 330. When the voltage reaches a value corresponding to a preset exposure factor, the pulses from UJT 310, applied through the capacitor 317, turns ON the diode 330 and the pulses are then applied to the gate of thyristor 331. When thyristor 331 is turned ON, the electromagnetic solenoid 333 is energized thereby releasing the trailing shutter curtain.

After the completion of the photographing operation the thyristors 314 and 331 are turned OFF by opening the source switch 334. Although in the circuit shown in FIG. 23, there is only one CdS 307, nevertheless, exposure factor control may be accurately controlled even though light intensity of the photographed object varies, since it is the actual light dependent pulses themselves which are stored.

Figure 24:
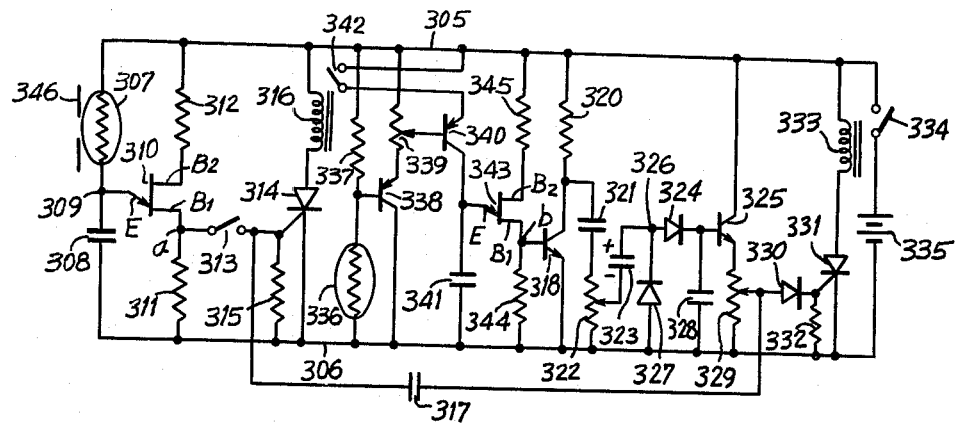

FIG. 24 is a modification of the circuit of FIG. 23, and includes a second CdS for the exposure factor control circuit means. The parts common to that of FIG. 23 are designated by like reference numerals and description thereof is omitted. In FIG. 24 there is provided another CdS 336 adapted to receive light intensity from the photographed object and also the circuitry includes a series circuit arrangement of the CdS 336 and a resistor 337. The series circuit is connected between the positive and negative buses 305 and 306. A junction point of the series circuit is connected to the base of transistor 338, the collector of which is connected to the negative bus 306 and the emitter of which is connected to the positive bus 305 through a variable resistor 339. The slidable contact of the variable resistor 339 is connected to the base of transistor 340 the collector of which is connected to the negative bus 306 through a capacitor 341, and the emitter of which is connected to the positive bus 305 through a switch 342 adapted to be closed by the electromagnetic solenoid 316. The collector of transistor 340 is connected to the emitter E of a UJT 343, of which the first base $B_1$ is connected to the negative bus 306 through a resistor 344 and the second base $B_2$ is connected to the positive bus 305 through a resistor 345. The first base $B_1$ of the UJT 343 is connected to the base of the transistor 318.

The circuit shown in FIG. 24 operates as follows:

When the switch 313 is closed, the next pulse from the UJT 310 turns ON thyristor 314 and thereby energizes the solenoid 316 to release the leading curtain and to close switch 342 thereby activating transistor 340. Variation in brightness of the photographed object is detected by CdS 336. When it becomes darker, for example, the internal resistance of CdS 336 increases so that the voltage gennerated across the variable resistor 339 decreases. As a result the internal resistance of transistor 340 increases and the time constant of the timing capacitor 341 is also increased with the result that the pulse frequency at the point $b$ of the first base $B_1$ of UJT 343 is decreased. This causes the transistor 318 to operate in a manner as was heretofore described with respect to FIG. 23. The pulses are stored in the storing capacitor 328. Thus, the trailing shutter curtain is released in the manner heretofore described.

Figure 25:
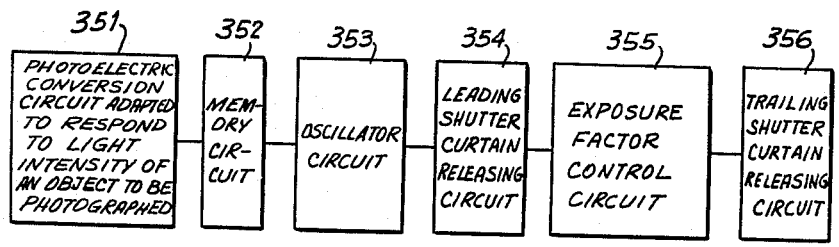

Referring now to FIG. 25, there is shown a modification of the fourth system to accommodate a photosensitive element located internally of the camera. In FIG. 25 block 351 represents a circuit for converting light intensity into electrical information. A memory circuit 352 receives and stores the electrical information. Oscillator circuit means 353 produces a series of pulses corresponding to the information stored in the memory circuit 352. A leasing shutter curtain circuit 354 is actuated by a pulse from the oscillator 353. An exposure factor control circuit 355 provides a time duration signal as a function of the exposure factors and after the time duration a pulse is sent to a trailing shutter curtain circuit 356 to close the shutter.

Figure 26:
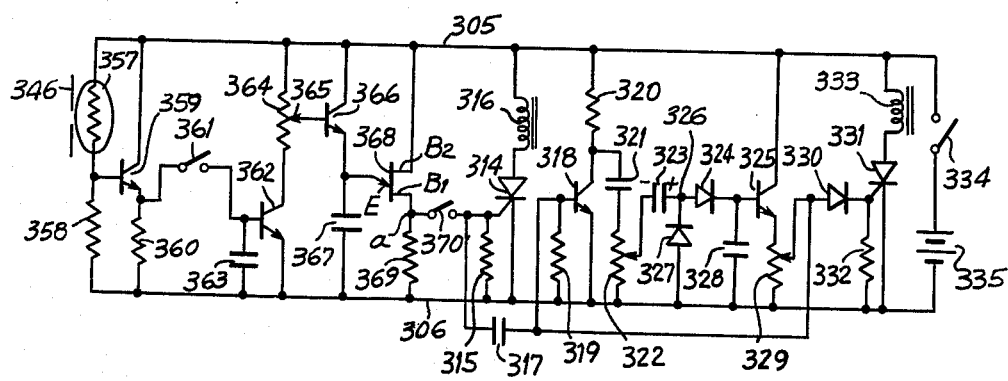

FIG. 26 shows a wiring circuit arranged according to FIG. 25 and is a modification of the circuit of FIG. 23. The parts of FIG. 26 common to those of FIG. 23 are designated by like reference numerals and description thereof is omitted. Referring now to FIG. 26 there is shown a series circuit arrangement comprising CdS 357, disposed in the path of light coming through the objective from an object being photographed, and a resistor 358. This series circuit is inserted between the positive bus 305 and the negative bus 306. A junction point of this series circuit is connected to the base of transistor 359 the collector of which is connected to the positive bus 305 and the emitter of which is connected to the negative bus 306 through a resistor 360. The emitter of transistor 359 is connected to the base of a high input impedance transistor 362 through a normally closed switch 361. The base of transistor 362 is connected to the negative bus 306 through a capacitor 363 adapted to store information on light intensity of the photographed object. The collector of transistor 362 is connected to the positive bus 305 through a variable resistor 364 and the emitter thereof is directly connected to the negative bus 306. The sliding contact 365 of the variable resistor 364 is connected to the base of transistor 366, the collector of which is connected to the positive bus 305 and the emitter of which is connected to the negative bus 306 through a timing capacitor 367. The emitter of transistor 366 is also connected to the emitter E of UJT 368, the first base $B_1$ of which is connected to the negative bus 306 through a resistor 369 and the second base $B_2$ of which is connected to the positive bus 305. The first base $B_1$ of the UJT 368 is also connected to the rest of the circuit through a switch 370 adapted to be closed upon depression of the shutter release button on the camera.

The circuit of FIG. 26 operates as follows:

Upon closure of the source switch 334, information which has been detected by CdS 357 and photoelectrically converted into an electrical signal is stored into the memory capacitor 363 through the emitter of transistor 359. The transistor 362 is controlled on the basis of the stored voltage value and the internal resistance of the transistor 366 is controlled according to a potential difference appearing across the variable resistor 364. Photoresponsive oscillation pulses now appear at the point $a$ on the first base $B_1$ of UJT 368 with a time constant determined by the timing capacitor 367 and the internal resistance of transistor 366. The switch 361 before complete depression of the shutter release button and the switch 370 is closed so that the thyristor 314 is turned ON to release the leading curtain. Pulses are then successively stored in the storing capacitor 328 in accordance with the exposure factor, and after a predetermined time has elapsed the trailing shutter curtain is released as has heretofore been described.

Figure 27:
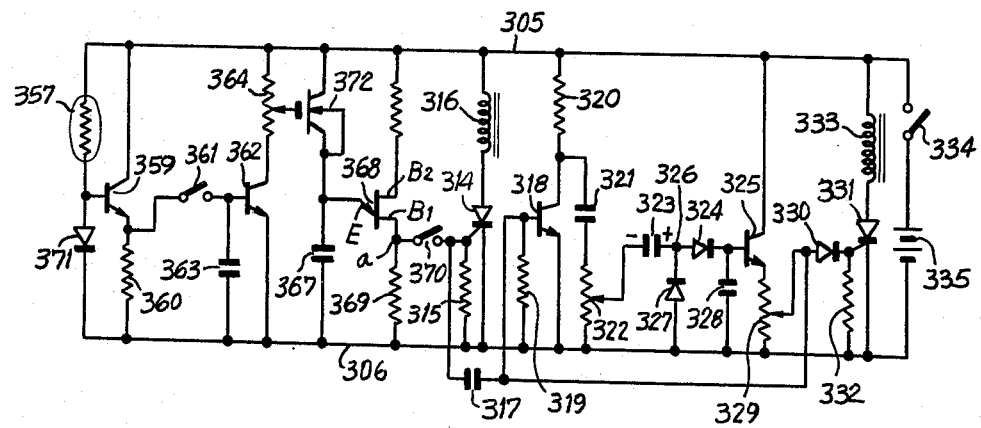
Figure 28:
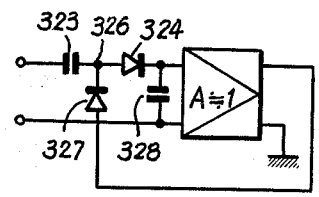
Figure 29:
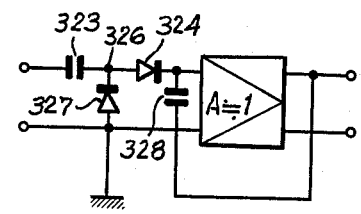

Referring now to FIG. 27 there is shown a modification of the circuit of FIG. 26 including logarithmic compression and expansion circuitry. In FIG. 27 the resistor 358 and the transistor 366 of FIG. 26 are respectively replaced by a diode 371 and a field effect transistor 372. In this circuit, light intensity at a photographed object which has been detected by the CdS 357 is stored in the memory capacitor 363 after logarithmic compression by means of the diode 371. Voltage stored in the capacitor 363 is logarithmically expanded by the field effect transistor 372. The internal resistance of transistor 372 and the timing capacitor 367 together determine the time constant with which pulses appear at the point $a$ on the first base $B_1$ of the UJT 368. With the circuit arrangement as shown, pulse oscillation is carried out at a stage of logarithmic expansion and advantageous results are achieved in that the effects of variation in source voltage, temperature and the other factors may be reduced to a minimum.

Figure 30:
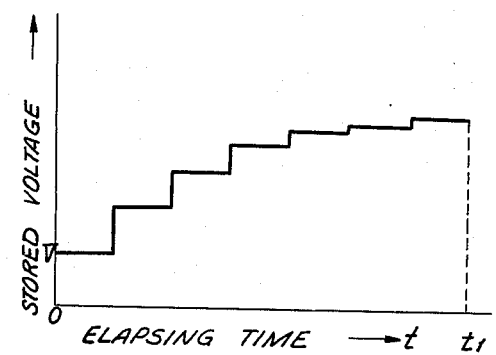
Figure 31:

The pulse voltage is stored in the storing capacitor 328 in the form of pulse integration. Voltage stored in the capacitor should increase directly according to the number of pulses. However, it becomes difficult to maintain equal incremental increases, as is shown in FIG. 30. As the elapsed time becomes longer, the step increments decrease. Thus, there may be an error when the exposure time is relatively long. The condition according to which the capacitor stores voltage at non-equal intervals may be expressed by equations as set forth below. It is assumed that a pulse voltage $e$ which is controlled in accordance with the light intensity at the photographed object is applied to the input of the storing circuit. This voltage is shown in FIG. 31. With the first pulse of the pulse voltage $e$, the capacitor 323 is charged with a value $e'$, wherein $e = e'$, as long as the charging time constant is sufficiently smaller than the pulse width. The voltage charged into capacitor 323 is stored into capacitor 328. If the voltage across capacitor 328 is $V_1$ after the first pulse, then:

$$V_1 = \frac{C_1}{C_1 + C_2} e \qquad (1)$$

wherein $C_1$ is the value of capacitor 328 and $C_2$ is the value of capacitor 323. Upon arrival of the second pulse, the terminal voltage becomes $V_2$, wherein:

$$V_2 = (e - V_1) \frac{C_1}{C_1 + C_2} = e \left(1 - \frac{C_1}{C_1 + C_2}\right) \frac{C_1}{C_1 + C_2} = \frac{C_1 C_2 e}{(C_1 + C_2)^2} \qquad (2)$$

Therefore:

$$V_2 + V_1 = e \left[1 - \left(\frac{C_2}{C_1 + C_2}\right)^2\right] \qquad (3)$$

The terminal voltage $V$ after n pulses can be generally expressed by:

$$V = e \left[1 - \left(\frac{C_2}{C_1 + C_2}\right)^n\right] \qquad (4)$$

FIG. 30 is a graph showing the value of $V$ for increasing values of $n$. The wave form of the stored voltage illustrated in FIG. 30, is not directly proportional to the elapsing time and, therefore, there occurs an error in the exposure factor value. This error may be compensated by application of a positive feedback voltage to the storing capacitor, as will hereinafter be described.

As seen from said equation (2) particularly from $$V_2 = (e - V_1) \frac{C_1}{C_1 + C_2},$$

non-linearity of the stored voltage is due to $V_1$ in the function $(e - V_1)$. In other words, the error is substantially influenced by any residual electric charge in the capacitor during progressive recharging of the capacitor. This residual charge may be compensated for by any means adapted to extinguish such as influence. For example, when the positive feedback voltage corresponds to $V_1$, the equation leads to $$V_2 = (e - V_1 + V_1) \frac{C_1}{C_1 + C_2} = \frac{C_1}{C_1 + C_2} e \qquad (5)$$

Accordingly, $$V = \frac{C_1}{C_1 + C_2} e \times n \qquad (6)$$

Figure 32:
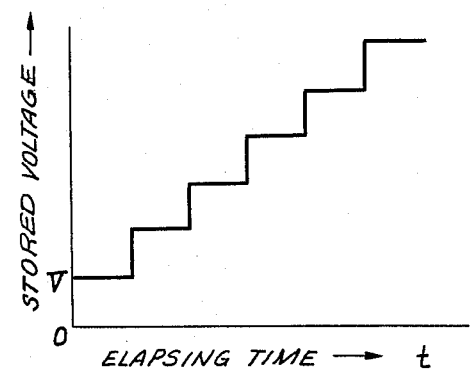
Figure 33:
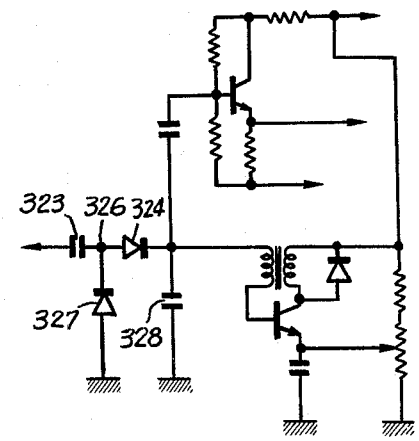

Thus, even when n continuous pulses are applied, the terminal voltage $V$ rises in direct proportion to n as is illustrated in FIG. 32. A compensation circuit suitable for this purpose is the feedback circuit shown in block diagram in FIG. 28 and a mirror circuit thereof shown in FIG. 29. A detailed circuit for such a purpose is the bootstrap circuit shown in FIG. 33.

According to the fourth system, each circuit is activated by application of pulses, so that each circuit may be activated with the pulses shaped by a monostable circuit or the like.

With the last system of this invention the arrangement of the oscillator circuit may be more simplified since the oscillator circuit is separate from the storing circuit which provides exposure factor control. The modification of this embodiment wherein the shutter closure is effected with the pulse which arrives immediately after the storage voltage reaches the predetermined value corresponding to exposure factor brings about the further advantage that excellent control sensitivity is obtained and, accordingly, the precision of exposure time may be substantially improved. The excellent control is obtained even when the storage value increases at non-equal increments.

There has heretofore been described a controlled circuit for a camera shutter of the frequency conversion type wherein pulses having a frequency which varies in accordance with the light intensity of a photographed object are obtained. During depression of the shutter button on the camera, the next immediately following oscillation pulse opens the shutter. An exposure circuit converts present exposure factors into a time duration. At the end of the time duration, a signal is sent to a shutter closing circuit to close the shutter. In the first system of this invention, pulses from the oscillation circuit are sent to the shutter closing circuit but are inhibited from effecting the closing circuit until such time as a control signal is sent from the exposure circuit. In the second system of the invention, during the exposure time duration, as determined by the exposure circuit, oscillation pulses are inhibited from being produced. In the third system, the oscillation pulses are sent to a flip-flop circuit which produces pulses in accordance with a binary output signal, the exact binary output being preselected in accordance with the exposure factors. In the fourth system, the oscillation pulses are cumulatively stored, and when the stored voltage equals a predetermined value the shutter closing circuit is released.

Each of the embodiments can include a modification to accommodate a photosensitive means located to receive light intensity external to the camera or can be utilized together with a memory means and a photosensitive element positioned internally of the camera to receive light reflected through the objective. Furthermore, the embodiments can be modified to utilize logarithmic compression and expansion circuitry and a further feature obtained is that exposure factor control is performed at a stage of logarithmic expansion thereby eliminated additional errors introduced by the exposure calculation and the electronic component elements. The exposure factor control can include such items as the ASA sensitivity of the film as well as other exposure factors, and is controlled by the light intensity of the object being photographed.

Particularly in the case of circuitry utilizing logarithmic compression and expansion where exposure control occurs after expansion it is possible to provide electrical controls of the frequency compression type where a more accurate exposure control is achieved as compared with conventional constructions where exposure controls are carried out in the compression stage. Furthermore, with the structure of the invention inaccuracies resulting from variations in temperature and source voltage may be effectively avoided.

What is claimed is:

1. In a camera having an electronically controlled shutter, oscillation means for providing a series of pulse signals whose frequency is a function of light intensity at an object to be photographed, shutter-opening circuit means electrically connected with said oscillation means for opening the shutter in response to one of said pulses selected by a shutter-release operation, exposure circuit means electrically connected with said shutter-opening circuit means for responding to said one pulse for converting preset exposure factors into a time duration starting with said one pulse and for providing a control signal after the elapse of said time duration, and shutter-closing circuit means electrically connected to said exposure circuit means for receiving said control signal and in cooperation therewith closing the shutter.

2. The combination of claim 1 anad wherein a photosensitive means for receiving light from the object to be photographed and for converting said light into a corresponding electrical quantity is electrically connected with said oscillation means for controlling said oscillation means.

3. The combination of claim 2 and wherein a memory circuit means is electrically connected between said photosensitive means and said oscillation means for storing the electrical quantity, and wherein the period of the series of pulse signals is determined by the stored electrical quantity.

4. The combination of claim 3 and wherein a normally closed switch means is connected between said photosensitive means and said memory circuit means for assuming an open position immediately prior to opening of the shutter.

5. The combination of claim 2 and wherein a logarithmic compression means is electrically connected with said photosensitive means for storing said electrical quantity in a logarithmically compressed form, and logarithmic expansion means electrically connected between said logarithmic compression means and said oscillation means for transmitting a logarithmically expanded signal to said oscillation means.

6. The combination of claim 5 and wherein said logarithmic compression means includes diode means and wherein said logarithmic expansion means includes field effect transistor means.

7. The combination of claim 1 and wherein said preset exposure factors are controlled according to said light intensity at the object to be photographed.

8. The combination of claim 1 and wherein said shutter-closing circuit means comprises normally reversed biased diode means for receiving said control signal and becoming forward biased in response thereto, thyristor means having a gate coupled to said diode means for receiving an input therefrom, and trailing shutter curtain switch means in series with said thyristor means for closing the shutter when said thyristor means conducts.

9. The combination of claim 1 and wherein said shutter-opening circuit means comprises thyristor means having a gate coupled to said oscillator means and leading shutter curtain switch means connected in series with said thyristor means for opening the shutter when said thyristor means conducts.

10. The combination of claim 1 and wherein a switch means is serially connected between said oscillator means and said shutter-opening circuit means for effecting said release operation.

11. The combination of claim 2 and wherein said shutter-closing circuit means is electrically connected to said oscillator means for receiving said series of pulses and for closing the shutter in response to the next occurring pulse following the occurrence of said control signal.

12. The combination of claim 11 and wherein said photosensitive means is situated internally of the camera to receive light passing through a camera objective and wherein a storage means is electrically connected to said photosensitive means for receiving the electrical quantity from said photosensitive means, for storing it as a voltage proportional to said electrical quantity and for applying it to said oscillator means for controlling the frequency of said series of pulses.

13. The combination of claim 12 and wherein said preset exposure factors are controlled according to said stored voltage.

14. The combination of claim 12 and wherein a logarithmic compression means is electrically connected with said photosensitive means for storing the electrical quantity from said photosensitive means in logarithmic compressed form, first logarithmic expansion means connected between said logarithmic compression means and said oscillation means for receiving said stored electrical quantity and for providing a logarithmically expanded signal which is applied to said oscillation means, and second logarithmic expansion means connected between said logarithmic compression means and said exposure control means for transmitting a logarithmically expanded signal to said exposure circuit means.

15. The combination of claim 10 and wherein said exposure circuit means comprises first transistor means, variable resistor means preset in accordance with exposure factors, means responsive to the light intensity at the object to be photographed, said last-mentioned means and said variable resistor means being connected to said first transistor means to control the internal resistance thereof, capacitor means connected in series with said first transistor means, and signal circuit means connected to a junction between said first transistor means and said capacitor means for providing a control signal after a time delay determined by the capacitance of said capacitor means and the internal resistance of said first transistor means.

16. The combination of claim 11 and further including oscillation termination means connected to said shutter-closing circuit means, said exposure circuit means and said oscillation means for terminating said series of pulses from said oscillation means during the time duration determined by said exposure circuit means.

17. The combination of claim 16 and wherein said exposure circuit means includes capacitor means adapted to be charged prior to said release operation, first transistor means connected in series with said capacitor means and having an internal impedence preset in accordance with exposure factors and wherein said termination means comprises second transistor means connected to said oscillation means for short circuiting the same when in a conductive state, Schmitt trigger circuit means having an input connected to said first transistor means and an output connected to said second transistor means so that when said capacitor means discharges through said first transistor in response to said one pulse, said Schmitt trigger changes state to thereby cause said second transistor to conduct thereby terminating further oscillation pulses, and when said capacitor means has discharged said Schmitt trigger circuit means returns to its original state thereby causing said second transistor means to stop conducting thereby again commencing operation of the oscillation means.

18. The combination of claim 16 and wherein said exposure circuit comprises capacitor means adapted to be charged prior to said release operation, pulse means coupled to said capacitor means for producing a negative pulse in response to the discharge of said capacitor means, transistor means for short circuiting when in a conductive state said oscillation means, multivibrator circuit means having an input connected to respond to said pulse means and an output connected to said transistor means for causing, so when said capacitor means discharges, said transistor means to conduct thereby short circuiting said oscillation means and for returning, when said capacitor has completed discharge, to its original state thereby causing said transistor means to stop conducting and said oscillation means again to commence producing said oscillation pulses.

19. The combination of claim 1 and wherein said exposure circuit means comprises a plurality of cascaded flip-flop means, and selecting switch means having a plurality of contacts capable of being preset with a predetermined number representative of said exposure factors, said selecting switch means being electrically connected between said shutter-closing circuit means and said cascaded flip-flop means with said contacts respectively connected to outputs of said flip-flop means whereby said control signal is produced when the flip-flop means corresponding to the number selected on the selecting switch means produces an output pulse, and wherein said cascaded flip-flop means receive said series of pulse signals from said oscillation means.

20. The combination of claim 19 and wherein one of the contacts of said selecting switch means is electrically connected to said oscillation means to directly receive said series of pulse signals.

21. The combination of claim 19 and wherein said shutter-closing circuit means is connected to said oscillator means for causing the next occurring pulse following the occurrence of said control signal to close the shutter.

22. The combination of claim 19 and wherein said control signal causes said shutter-closing circuit means to close the shutter.

23. The combination of claim 1 and wherein said exposure circuit means comprises voltage producing means for receiving said series of pulse signals and for producing in response to each of said pulse signals a step voltage the amplitude of which is a function of said exposure factors, and storing means connected to said voltage producing means for cumulatively storing said step voltage and for providing a control signal when said cumulatively stored step voltage reaches a predetermined value.

24. The combination of claim 23 and wherein said shutter-closing circuit means is connected to said oscillator means for receiving said series of pulses and for closing the shutter in response to the next occurring pulse following the occurrence of said control signal.

25. The combination of claim 23 and wherein said storage means comprises first capacitor means, first diode means having a series connection therewith, second diode means oppositely poled to said first diode means and connected between the series connection of said first capacitor means, and said first diode means and between a commmon terminal, and second capacitor means connected between the other side of said first diode means and said common terminal, said second capacitor means retaining the cumulatively stored step voltage.

26. The combination of claim 25 and further comprising feedback compensation means connected to said second capacitor means for reducing the error caused by cumulative electric charge on said second capacitor means.

27. The combination of claim 23 and wherein said exposure circuit means further comprises means responsive to the light intensity of the object being photographed, variable resistor means preset in accordance with the exposure factors, and transistor means connected to said variable resistor means for having an internal resistance controlled by said variable resistance means and said means responsive to light intensity, said transistor means being coupled to said voltage producing means to control the amplitude of the step voltage.

* * * * *